United States Patent
Strand et al.

(10) Patent No.: US 9,864,778 B1
(45) Date of Patent: Jan. 9, 2018

(54) SYSTEM FOR PROVIDING EVENTS TO USERS

(71) Applicant: AMAZON TECHNOLOGIES, INC., Seattle, WA (US)

(72) Inventors: William Alexander Strand, Sammamish, WA (US); Samuel Appelbaum, Seattle, WA (US); Raphael Hsieh, Seattle, WA (US); James Ronald Spencer, II, Redmond, WA (US)

(73) Assignee: Amazon Technologies, Inc., Seattle, WA (US)

(*) Notice: Subject to any disclaimer, the term of this patent is extended or adjusted under 35 U.S.C. 154(b) by 324 days.

(21) Appl. No.: 14/500,571

(22) Filed: Sep. 29, 2014

(51) Int. Cl.
*G06F 17/30* (2006.01)
*H04L 29/08* (2006.01)
*G06Q 30/02* (2012.01)

(52) U.S. Cl.
CPC .. *G06F 17/30522* (2013.01); *G06F 17/30241* (2013.01); *G06Q 30/0256* (2013.01); *H04L 67/306* (2013.01)

(58) Field of Classification Search
CPC ........ G06F 17/30522; G06F 17/30241; G06Q 30/0256; H04L 67/306
See application file for complete search history.

(56) References Cited

U.S. PATENT DOCUMENTS

| | | | |
|---|---|---|---|
| 7,957,565 B1* | 6/2011 | Sharma | G06K 9/00778 382/103 |
| 2007/0061245 A1* | 3/2007 | Ramer | G06F 17/30867 705/37 |
| 2008/0154696 A1* | 6/2008 | Spiegelman | G06F 17/30867 705/7.32 |
| 2008/0281665 A1* | 11/2008 | Opaluch | G06F 17/3053 705/5 |
| 2009/0033491 A1* | 2/2009 | Saunders | G06F 19/327 340/568.5 |
| 2009/0298514 A1* | 12/2009 | Ullah | G01S 5/02 455/456.5 |
| 2011/0093340 A1* | 4/2011 | Kramer | G06Q 30/02 705/14.58 |
| 2011/0145051 A1* | 6/2011 | Paradise | G06Q 30/02 705/14.25 |
| 2012/0159327 A1* | 6/2012 | Law | H04N 21/47217 715/716 |
| 2013/0080447 A1* | 3/2013 | Ramer | G06F 17/30867 707/748 |
| 2013/0267253 A1* | 10/2013 | Case | H04W 4/021 455/456.3 |
| 2013/0275164 A1* | 10/2013 | Gruber | G10L 17/22 705/5 |

(Continued)

*Primary Examiner* — Leslie Wong
(74) *Attorney, Agent, or Firm* — Lindauer Law, PLLC

(57) ABSTRACT

Described are techniques to provide event data to users. Event data corresponding to one or more events may be received from a first device. Availability data corresponding to availability of a user regarding events may be received from a second device. The event data that corresponds to at least a portion of user data associated with the second device may be determined, and at least a portion of the event data is provided to the second device. Rating data acquired or generated by a device present at the event location may be used to adjust a rating metric associated with the event.

20 Claims, 9 Drawing Sheets

(56) References Cited

U.S. PATENT DOCUMENTS

| | | | | |
|---|---|---|---|---|
| 2013/0282438 A1* | 10/2013 | Hunter | ............... | G01S 1/02 |
| | | | | 705/7.32 |
| 2014/0128021 A1* | 5/2014 | Walker | ............. | H04W 52/0212 |
| | | | | 455/405 |
| 2014/0280575 A1* | 9/2014 | Cowan | ................ | H04L 67/22 |
| | | | | 709/204 |
| 2014/0297455 A1* | 10/2014 | Zhao | ................ | G06Q 30/0631 |
| | | | | 705/26.7 |
| 2014/0344093 A1* | 11/2014 | Du | ..................... | G06Q 30/06 |
| | | | | 705/26.2 |
| 2015/0025790 A1* | 1/2015 | Hwang | ............... | G08B 25/10 |
| | | | | 701/411 |
| 2016/0042342 A1* | 2/2016 | Proctor, Jr. | ......... | G06Q 20/202 |
| | | | | 705/39 |
| 2016/0170998 A1* | 6/2016 | Frank | ............. | G06F 17/30702 |
| | | | | 707/748 |

* cited by examiner

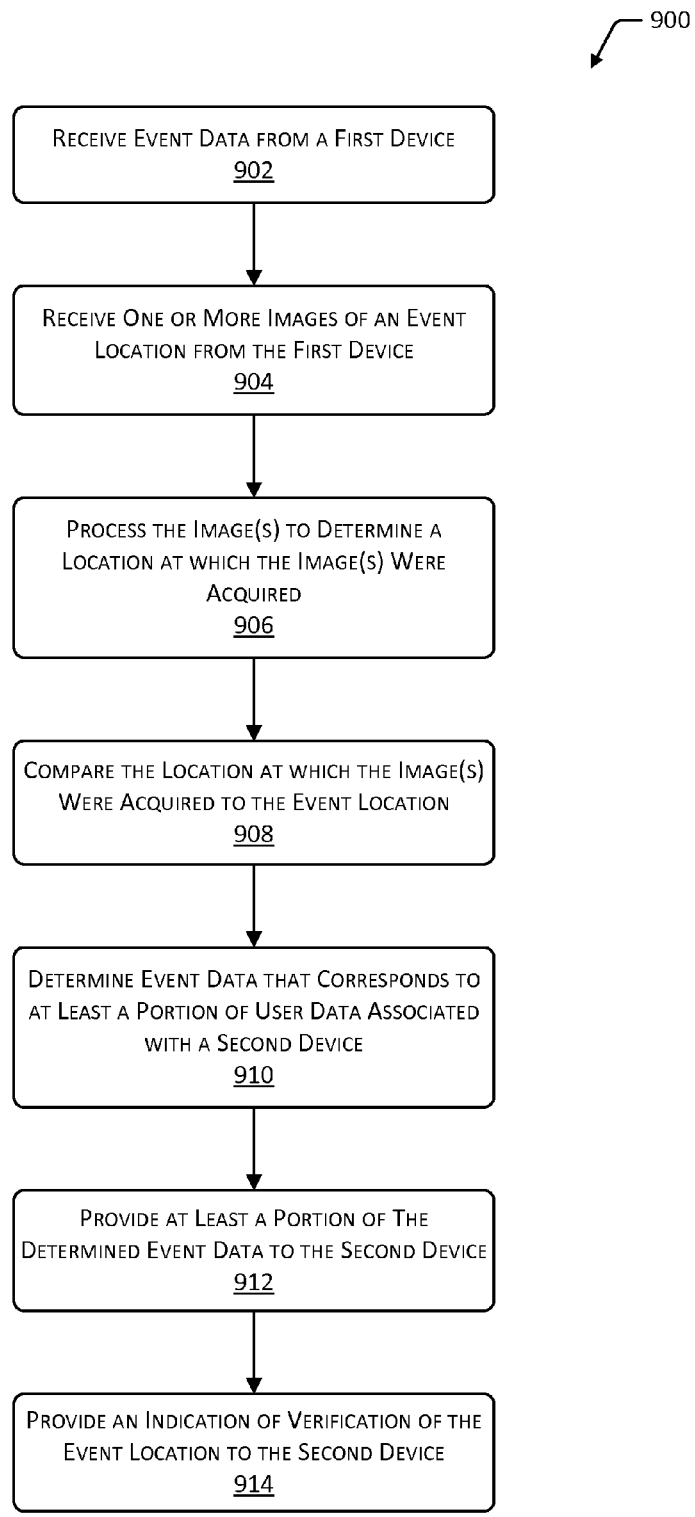

SYSTEM FOR PROVIDING EVENTS TO USERS

BACKGROUND

Existing online platforms usable to locate events of interest to users require a significant amount of manual entry and searching, by both event originators and event attendees. For example, a user seeking to attend an event must typically input a variety of preferences or filters, or manually provide a search query, with the intent of locating an event that corresponds to the manually-provided data. Likewise, event originators must input sufficient information associated with an event to enable location of the event through search queries or use of user profile data. Systems that automate one or more portions of this process would benefit both event originators and event attendees.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

FIG. 9 is a flow diagram illustrating a process to verify event data for provision to a user.

Figure 1:
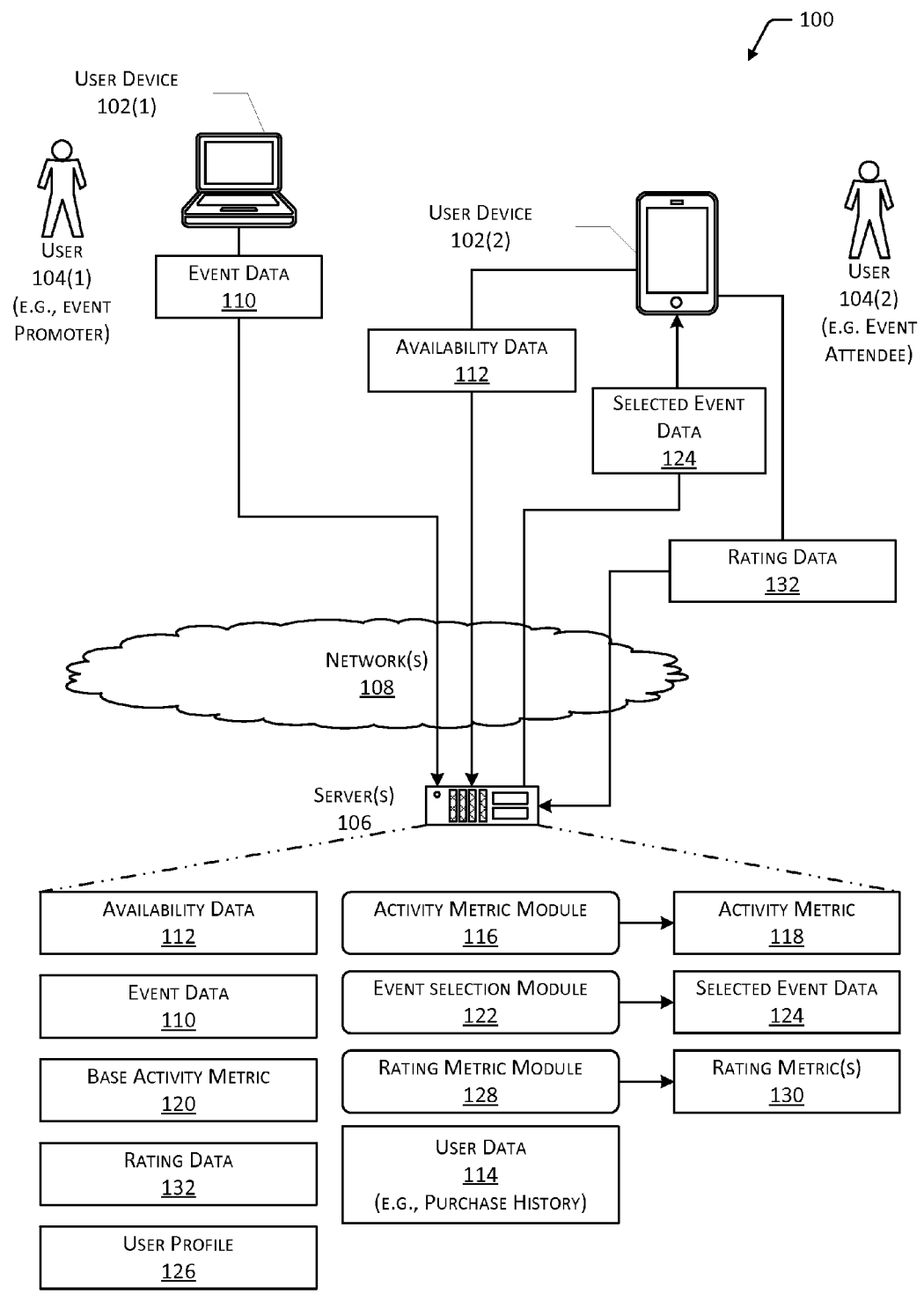
FIG. 1 depicts a system configured to provide and receive event data to and from user devices.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include," "including," and "includes" mean including, but not limited to.

DETAILED DESCRIPTION

Existing network-based platforms for providing information regarding events to users include an event originator (e.g., an event organizer) that inputs information about an event, such as the date, time, location, and activities associated with the event. The event originator also typically inputs a list of invitees and information sufficient to contact each invitee via at least one medium, so that the event information may be provided to each invitee. For events not restricted to specific invitees, event information may be made available in a public forum. Individuals currently available to attend an event may locate the event through manual searching or through the provision of a user profile containing various preferences or other data to filter events. If an available user does not specifically search for an event to attend, or if an event originator fails to input sufficient information for the event to be readily discovered through user-initiated searches, the event will fail to maximize user traffic.

Implementations within the scope of the present disclosure include systems, methods, and computer-readable media configured to automate processes to match users with suitable events. Event data, such as a location, time, or category corresponding to a plurality of events may be received from one or more user devices. In other implementations, preexisting event data may be accessed by one or more computing devices. User data may be used to determine the potential interest of one or more users in an event. User data may be received from a device associated with a prospective event attendee, or preexisting user data may be accessed for use.

User data may include preexisting or historical items of information related to a user, such as device location data, time data, a purchase history, a browsing history, a search history, event attendance history, and so forth. In some implementations, the user data may be determined from preexisting data without requiring user input. In other implementations, the user data may include one or more preferences input by the user.

The user data may be used to determine a base activity metric associated with a user, such as by determining patterns in the user data associated with a user device indicative of expected user behaviors. For example, a user device may historically be present at specific locations during specific times of day, or a user device may be used to purchase specific items or types of items routinely. In another example, a user device may exhibit a browsing history or a search history containing one or more identifiable patterns. A calendar or task list associated with a user device may contain repeating or discrete activities. From these data objects and other user data, typical user behaviors, such as expected locations, times, purchase activities, or browsing activities associated with the user may be determined.

Availability data of a user may be determined from a user device. Availability data may include one or more indications of the availability of the user to attend one or more events. In some implementations, the availability data may include a current location of the user device, an unoccupied date or time stored in an electronic calendar or task list associated with the user device, or one or more preferences input by the user. For example, the user may indicate certain times of day (e.g., times corresponding to work or sleep) that the user is not available to attend events or receive information regarding events, independent of the current location or the calendar data associated with the user device. Similarly, the user may indicate certain times of day that the user desires to attend events or receive information regarding events, independent of the availability data determined from the user device. In some implementations, motion of a user device (e.g., determined using an accelerometer, gyroscope, or other type of motion sensor) may be used to determine user availability.

In some implementations, in the absence of preferences provided by a user, a determination regarding user availability may be made automatically. A deviation from the base activity metric determined from the user data may be determined by comparing the availability data to the base activity metric. A deviation from the base activity metric may indicate availability of the user. In other implementations, a user may manually indicate availability, or a user may manually search event data, such as by using a search query or other filters, to locate events of interest.

Subsequent to a determination of user availability, at least a portion of the event data and at least a portion of the user data may be used to select one or more events. For example, a portion of the event data may be compared to a portion of the user data to determine an event that corresponds to the user data. At least a portion of the event data relating to the one or more selected event(s) may be provided to the user device. For example, events having a location within a threshold distance of the current location or a historical location of the user device may be selected.

In some implementations, the event data may include a category, which may be indicative of an item, such as a good or service, a type of item, or an activity involving one or more types of items. At least a portion of the purchase history, browsing history, search history, or device data associated with a user may correspond to the category of the event.

In some implementations, a rating metric associated with the event data may be determined. The rating metric associated with an event may be provided to users concurrently with other event information, such as the location and time of the event. For example, rating data, such as ratings or reviews from one or more user devices, may be received and used to determine a rating metric. The rating data received from user devices may be weighted based on user data associated with the user. For example, rating data received from a user that has attended a large number of events previously may affect a rating metric more significantly than rating data received from a user with little or no event history. In other implementations, images, audio files, videos, or messages (e.g., textual, audio, or video messages) associated with an event may be received. Messages may include, for example, textual messages, audio messages, or video messages. The number of received images, audio files, videos or messages or the content thereof may be used to determine a rating metric. For example, image analysis may be performed on one or more images or videos to determine facial expressions, user activities, a number of users present in an image or video, or other content corresponding to positive or negative user experiences. Similarly, audio analysis or analysis of text-based messages may be performed to determine verbal language or text corresponding to positive or negative user experiences.

In some implementations, rating data may be determined from user devices automatically, without requiring user input. The rating data determined from a user device may be weighted based on user data associated with a user of the device. For example, rating data received from a user that is habitually present at an event location, and frequently generates messages discussing the event location, may have a less significant effect on a rating metric than rating data received from a user who deviated from typical behavior to attend an event. Continuing the example, a user habitually present at the event location is less likely to be present at the event location due to the event. Therefore, rating data indicating the attendance of the user at the event location may be provided with less weight than rating data received from a user who deviated from typical behavior to attend the event.

Rating data received from user devices may include one or more metrics corresponding to an event. For example, motion sensors or cameras associated with one or more user devices at an event location may determine an amount of motion currently occurring at the event location. Cameras associated with one or more user devices may determine a number of individuals present at the event location or an amount of ambient light at a location. Microphones associated with one or more user devices may determine an intensity of sound currently present at an event location. In some implementations, values for multiple metrics may be provided to a user concurrent with the event data. For example, a graph indicating the intensity of sound at an event location over a period of time (e.g., fifteen minutes) may be provided to a user receiving the event data. Providing multiple metrics to a user may enable the user to decide whether an event will provide a positive user experience more accurately than a numerical or subjective rating.

In one implementation, a base dwell time may be determined. The base dwell time may be a length of time that corresponds to the length of time spent by one or more users at or within a threshold distance of the event location. The length of time a user device remains within a threshold distance of the event location may be determined, such as through use of location sensors or cameras associated with the user device or the event location, and a variance between that length of time and the base dwell time may be used to modify the rating metric. Use of the length of time the one or more users remain within a threshold distance of an event location, or the number or content of images, audio files, videos, or messages generated by the one or more users at the event location, may enable a rating metric to be determined in the absence of manual input of rating data by the one or more users.

In some implementations, responsive to a determination that a user device is within a threshold distance of an event location, audio or video recording elements of a user device, or other audio or video recording elements at or near the event location, may be actuated, and audio, video, or image data may be received therefrom. The received audio, video, or image data may be used to enhance security of the event or to verify attendance of one or more users. In some implementations, the audio, video, or image data may be processed to determine content thereof that may be used to modify the rating metric associated with the event.

In other implementations, an identity associated with the device originating the event may be determined to enhance security of the event or modify the rating metric thereof. For example, a business identifier, an account identifier, or an age of the account associated with the device originating the event may be determined. By way of example, a business identifier may include a tax identifier number. An account identifier may include an account number or routing number associated with a business. In some implementations, one or more images of the event location may be received from the device originating the event. The images may be processed to determine the location at which the images were acquired, and the images may be compared to the event location to verify that the image(s) correspond to the event location.

Implementations within the scope of the present disclosure thereby enable users to be provided with event information corresponding to current or preexisting user data, in some cases automatically, due to a determination of user availability. Further, in some implementations, preexisting user data may be used to match users with suitable events even in the absence of user input.

FIG. 1 illustrates a system 100 configured to receive and provide event data to and from user devices. A first user device 102(1), associated with a first user 104(1), such as an event originator, promoter, sponsor, and so forth, and a second user device 102(2), associated with a second user 104(2), such as an event attendee, are shown in communication with one or more servers 106 via one or more networks 108. The user devices 102 may include, without limitation, cellular telephones, smartphones, tablet computers, laptop computers, portable computers, desktop computers, or other types of computing devices. The depicted server(s) 106 may include one or more servers 106 or other types of computing devices. The network(s) 108 may include public networks such as the Internet, private networks such as an institutional or personal intranet, or a combination thereof. The network(s) 108 may include any type of wired or wireless network, including, but not limited to, a personal area network (PAN), local area network (LAN), wide area network (WAN), and so forth. The network(s) 108 may communicate using Ethernet, Wi-Fi™, Bluetooth®, ZigBee®, 3G, 4G, LTE, Z-Wave, or other technologies.

In other implementations, the user device 102(1) may communicate with the user device 102(2) or other user devices 102 directly, via a local network 108, Bluetooth®, Near Field Communication (NFC), and so forth. In such implementations, one or more of the depicted modules and data shown associated with the server(s) 106 may be stored in association with the user device 102(1), the user device 102(2), or in association with other computing devices in communication therewith via the local network 108.

The user device 102(1) is depicted providing event data 110 to the server(s) 106 via the network(s) 108. The event data 110 may include a location of an event, a date or time of the event, a category associated with the event, or other information relevant to the event. Other information relevant to the event may include items an attendee may be advised or required to bring, a fee associated with the event, a ticket, a code to pass an entry gate, a password to gain access to a building, and so forth. The event data 110 may be stored in association with the server(s) 106 in a manner that enables subsequent querying thereof. In some implementations, the user device 102(1) may be used to create an event. In other implementations, the user device 102(1) may provide event data 110 relating to a preexisting event. For example, a user 104(1) associated with the user device 102(1) may travel to a location and discover a preexisting event that is currently occurring or about to occur. The user device 102(1) may be used to provide event data 110 relating to this preexisting event.

The user device 102(2) is depicted providing availability data 112 to the server(s) 106 via the network(s) 108. In some implementations, the availability data 112 may be determined by the server(s) 106 without requiring the active provision of the availability data 112 by the user device 102(2). For example, the server(s) 106 may, periodically or continuously, query or receive availability data 112 from the user device 102(2), or the availability data 112 may be stored in the server(s) 106. The availability data 112 may include, but is not limited to, a current, recent, or historic location of the user device 102(2), calendar data associated with the user device 102(2) (e.g., indicating available or occupied dates and times), or one or more user preferences. User preferences may include dates or times input by a user 104, during which the user 104 has indicated availability or lack thereof. In some implementations, the user preferences may be used to determine user availability independent of other items of availability data 112. In some implementations, the availability data 112 may include a manual input from the user device 102(2) indicating a current state of availability or unavailability. For example, a user 104 may input a search query to search the event data 110 for events of interest, thereby indicating availability. In some implementations, a user 104 may manually indicate general availability without inputting a search query, such as by submitting a request that the server(s) 106 or other computing devices in communication therewith determine one or more suitable events.

FIG. 1 depicts user data 114 stored in the server(s) 106. In some implementations, one or more of the event data 110, the availability data 112, or the user data 114 may be stored in association with one or more user devices 102 or with other computing devices in communication with the server(s) 106 or the user devices 102. The user data 114 may include preexisting data indicative of characteristics or preferences of a user 104 of the user devices 102(1), 102(2), other user devices 102. For example, the user data 114 may include one or more of the following: device location data (e.g., historical location(s) of a user device 102); time or calendar data associated with a user device 102; a purchase history, browsing history, or search history associated with a user 104; or event attendance history associated with a user 104. Event attendance history may include one or more events at which a user 104 was previously present, or events that were indicated as being of interest or disinterest to a user 104. User data 114 may be used to determine patterns or expected user 104 behaviors, such as locations a user 104 is likely to occupy, times that a user 104 is likely to be occupied or unoccupied, topics or items of interest to a user 104 based on the purchase history, search history, or browsing history of the user 104, and so forth. In some implementations, the user data 114 may be determined by the server(s) 106 without requiring user input. For example, the server(s) 106 may access location data, calendar data, purchase history, search history, browsing history, and so forth stored in association with a user device 102 or in association with the server(s) 106, in the absence of input from a user 104. In other implementations, the user data 114 may include user input data, such as user preferences regarding events, locations, times, dates, and so forth.

An activity metric module 116 may be used to determine an activity metric 118 associated with a user device 102. The activity metric 118 may include the availability of a user 104, or lack thereof, to attend an event. For example, in the depicted implementation, the activity metric module 116 may be used to process the availability data 112 determined from the user device 102(2) and portions of the user data 114 associated with the user device 102(2) to determine whether a user 104(2) associated with the user device 102(2) is available to attend events. In some implementations, at least a portion of the user data 114 may be used to determine a base activity metric 120, which may include typical or expected locations of the user device 102(2) at certain times, typical or expected purchasing, searching, or browsing activities, and so forth. For example, a user device 102 may historically be present at specific locations during specific times of day, such as a location corresponding to a user's 104 workplace during work hours, a location corresponding to a user's 104 bedroom during night hours, and so forth. One or more devices associated with the user 104 may be used to purchase specific items or types of items routinely. For example, a user 104 may purchase a beverage daily from a preferred venue while in transit to a workplace; a user 104 may purchase gasoline from gas stations within a certain region approximately once per week; a user 104 may visit a specific dry cleaning merchant twice per month; a user 104 may visit a specific automotive shop to purchase oil changing and disposal services approximately every three months; and so forth.

The availability data 112 may include one or more deviations from the base activity metric 120, and these deviations may indicate an availability of a user 104 or lack thereof. For example, a user device 102 may be present at a location corresponding to the home of the user 104 at a time when the user device 102 is typically located at the user's 104 workplace and on a date indicated as unoccupied on an electronic calendar associated with the user device 102. This deviation from the base activity metric 120 may indicate a holiday, vacation, illness, or another type of irregularity that may correspond to the availability of the user 104 to attend events. A determination that a user device 102 is present at a location during a time period, on a repeating basis, such as every weekday from 9:00 A.M. to 5:00 P.M., may result in a base activity metric 120 that indicates an expected location of the user device 102 during the corresponding time period. A determined location of the user device 102 during the corresponding time period that differs from the expected location may constitute a deviation from the base activity metric 120. Continuing the example, a determination that a user 104 regularly performs browsing or searching activities relating to a particular topic may result in a base activity metric 120 that indicates expected or habitual browsing or searching activities associated with the user 104. Determination of browsing or searching activities not indicated by the base activity metric 120, or determination of a lack of expected browsing or searching activities may constitute a deviation from the base activity metric 120.

For example, the availability data 112 may include a current location of the user device 102(2) that is not the workplace of the user 104(2), and calendar data indicating that the current time is not occupied by a preexisting engagement. Continuing the example, the availability data 112 may include current browsing activity of the user device 102(2) that does not relate to the occupation or regular hobbies of the user 104(2). These deviations from the base activity metric 120 associated with the user device 102(2) may indicate that the user 104(2) is not currently at his or her workplace, lacks any preexisting obligations or engagements at the current time, and is passively using the user device 102(2) in a manner that may indicate boredom or recreational use. The determined activity metric 118 may thereby indicate availability of the user 104(2) to attend one or more events or to receive information regarding one or more events.

An event selection module 122 may be used to determine selected event data 124 suitable for provision to a user device 102. For example, in the depicted implementation, the event selection module 122 may be used to process the event data 110 received from the user device 102(1) and portions of the user data 114 associated with the user device 102(2) to determine selected event data 124 that corresponds to the user data 114. In some implementations, the user data 114 may be used to generate a user profile 126 associated with the user device 102(2), which may include one or more event locations or event categories of likely interest to a user 104(2) or other user preferences. For example a user profile 126 may include one or more of a purchase history, browsing history, or search history associated with a user 104 as well as one or more of location data or calendar data associated with the user 104 indicative of previous user behavior. The user profile 126 may be generated automatically, without requiring user input, such as through use of preexisting items of user data 114. For example, location history data associated with the user device 102(2) may be used to determine locations frequently occupied by the user device 102(2); locations proximate to or similar to frequently occupied locations; locations that the user device 102(2) previously occupied but has not revisited recently; and so forth. Similarly, purchase history, browsing history, or search history associated with the user device 102(2) may indicate items of interest to a user 104(2), hobbies of the user 104(2), locations of interest to the user 104(2), friends or co-workers of the user 104(2), and so forth. For example, a manufacturer of a type of cellular telephone may create an event for users 104 and owners of the particular type of cellular telephone as well as for other individuals interested in learning about the particular type of cellular telephone. Purchase history associated with a user device 102 may indicate that the user 104 has purchased the particular type of cellular telephone. Search history or browsing history associated with a user 104 may indicate that the user 104 has researched or otherwise indicated an interest in the particular type of cellular telephone. Device data, such as the network address or any software or data currently running or stored on a user device 102, may indicate that the user device 102 is the particular type of cellular telephone associated with the event.

The user profile 126, or at least a portion of the user data 114 associated with the user device 102(2), may be compared with the event data 110 to determine selected event data 124 suitable for provision to the user device 102(2). For example, selected event data 124 indicative of locations that correspond to locations of interest determined from the user data 114, or selected event data 124 indicative of categories that correspond to items of interest determined from a purchase history, browsing history, or search history of the user 104(2) may be provided to the user device 102(2).

A rating metric module 128 may be used to determine a rating metric 130 associated with the selected event data 124. In some implementations, rating metrics 130 may be associated with specific events and provided to user devices 102 concurrently with selected event data 124 to provide users 104 with an overall rating associated with one or more of the events. For example, received ratings or reviews of an event may be used to calculate the rating metric 130 associated with the selected event data 124. Ratings or reviews received from users 104 may be weighted based on user data 114 associated with the user 104. In some implementations, images, audio files, videos, or messages generated by user devices 102 while within a threshold distance of an event location, or containing content related to selected event data 124, may be determined by the rating metric module 128 and used to calculate a rating metric 130 associated with the selected event data 124. For example, a count of messages or images generated by user devices 102 while attending an event, or the content of the messages or images, may be determined, such as through use of image processing, speech recognition, text recognition, and so forth. The number or content of the messages or images may be used to positively or negatively modify the associated rating metric 130. In other implementations, one or more of the availability data 112 or the user data 114 may be used to determine the rating metric 130. For example, location data indicating the length of time a user device 102 remains within a threshold distance of an event location or the number of user devices 102 present at an event location may be used to determine the rating matric 130.

In one implementation, event data 110 may be used to determine the rating metric 130. For example, if event data 110 corresponding to the same preexisting event is received from multiple user devices 102, the receipt of event data 110 from multiple sources may affect the rating metric 130 associated with the selected event data 124. In other implementations, the identity of the user 104 providing the event data 110 may affect the rating metric 130, such as by weighting rating data 132 provided by the user 104. For example, if the user device 102(1) is determined to be associated with an established business, such as by having a business account, meeting a threshold size, and so forth, association between the selected event data 124 and the established business may positively affect the rating metric 130. Similarly, if the user device 102(1) is determined to be associated with a user account of a certain age, the age of the user account may affect the rating metric 130.

One or more of the users 104 attending an event may result in modification to the rating metric 130 associated with the selected event data 124. For example, FIG. 1 illustrates the user device 102(2) providing rating data 132 to the server(s) 106. The rating data 132 may be processed by the rating metric module 128 to generate the rating metric 130 or to modify an existing rating metric 130. For example, the presence or absence of the user device 102(2) at an event location may positively or negatively affect the rating metric 130. The length of time the user device 102(2) remains at or within a threshold distance of the event location may affect the rating metric 130. In some implementations, a base dwell time may be determined. The base dwell time may include an average length of time one or more users 104 previously attended an event or a selected length of time that corresponds to the nature of the event. The extent to which the length of time the user device 102(2) is present at an event location exceeds or fails to reach the base dwell time may affect the rating metric 130. In other implementations, the number or content of one or more images, audio files, videos, or messages generated by the user device 102(2) while present at an event location may affect the rating metric 130.

In some implementations, the rating metric 130 may include one or more individual metrics indicative of characteristics of an event. For example, motion sensors or cameras associated with user devices 102 at an event location may determine an amount of movement at an event location. Microphones associated with user devices 102 may determine an intensity of sound at an event location. Cameras associated with user devices 102 may determine a number of individuals present at an event location. Depending on the nature of the event, such as indicated by the event data 110, one or more individual metrics may positively or negatively affect a rating associated with the event. For example, a high intensity of sound at a concert or party may positively affect a rating, while a high intensity of sound at a restaurant or library may negatively affect a rating. In some implementations, values for one or more metrics may be presented to users 104 in addition to or in lieu of an overall rating for an event. For example, users 104 may be presented with graphs depicting one or more of the amount of movement, the intensity of sound, the number of individuals associated with an event, and so forth, over a period of time.

Figure 2:
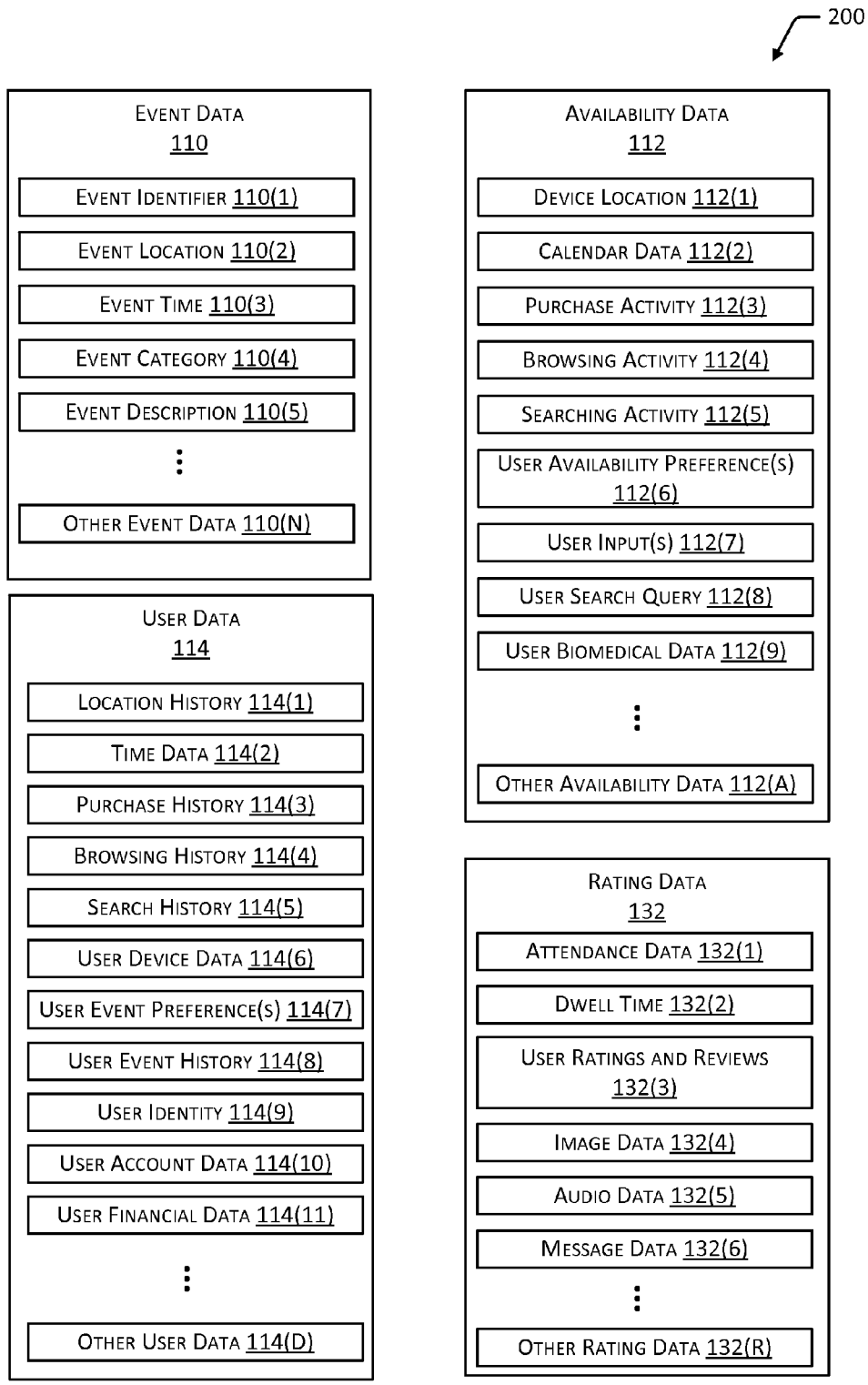
FIG. 2 is a block diagram illustrating implementations of event data, availability data, user data, and rating data.

FIG. 2 is a block diagram 200 illustrating implementations of the event data 110, the availability data 112, the user data 114, and the rating data 132, with the system 100 shown in FIG. 1

The event data 110 may include information associated with one or more events. In some implementations, events may be created by the user device 102 providing the event data 110. In other implementations, one or more events may be preexisting events, and a user device 102 may provide event data 110 regarding a preexisting event upon discovery of the event by a user 104 associated with the user device 102. The event data 110 may be stored in a manner that enables subsequent querying thereof by one or more users 104, such as by input of search queries, or by the event selection module 122.

FIG. 2. depicts the event data 110 including an event identifier 110(1), which may be any manner of text, image, or other data that may facilitate differentiation of one event from other events. For example, an event identifier 110(1) may include a name that is descriptive of one or more of the following: the nature of the corresponding event, the location of the event, the time of the event, and so forth. In some implementations, the event identifier 110(1) may include one or more images or one or more items of audio data.

The event data 110 may include an event location 110(2), which may indicate a location at which a corresponding event will occur. For example, the event location 110(2) may include a street address; the name of a building or business; a general location such as Yellowstone National Park or Southwest Houston; a specific location such as Ballroom #4 at a hotel or the statue of Anonymus in Budapest; and so forth.

The event data 110 may include an event time 110(3), which may include a date, time, date and time, or other general or specific data indicative of a specific date or time or a range of dates or times during which an event will occur. For example, the event time 110(3) may include a specific date and time; a general time such as Thursday night at sundown; a recurring time such as every second Thursday each month, at 7:00 P.M.; and so forth. The event time 110(3) may also include a time zone associated therewith. In some implementations, a time zone associated with a user device 102 may be determined, and one or more times associated with the event time 110(3) may be adjusted and provided to the user device 102 based on the time zone associated with the user device 102.

In some implementations, the event data 110 may include an event category 110(4). An event category 110(4) may correspond to a type of activity or subject matter associated with an event, the location of the event, the time of the event, one or more items (e.g., goods or services) associated with the event, and so forth. An event category 110(4) may be a broad descriptor of a type of event, such as events associated with food or drink. Conversely, an event category 110(4) may be a very specific descriptor of a type of event, such as a presentation on cutting apples with a Santoku knife. In some implementations, an event category 110(4) may be omitted for a particular event. For example, a user 104 may intend to drive traffic, by omitting the event category 110(4), to a location due to the allure of the location itself or due to the mysterious nature of the event. Provision of an event category 110(4), as well as an event identifier 110(1), to a user 104 may be excluded based on the type of event. For example, the event location 110(2) and event time 110(3) associated with a surprise party intended for one or more users 104 may be communicated to those users 104, while the event identifier 110(1) and event category 110(4) are omitted.

In some implementations, the event data 110 may include an event description 110(5). The event description 110(5) may include any manner of information, including text, images, audio data, or video data, to describe, illustrate, or demonstrate any characteristic of the associated event. In other implementations, the event description 110(5) may be omitted. For example, one or more of the event identifier 110(1), the event location 110(2), the event time 110(3), or the event category 110(4) may include sufficient information for a user 104 to formulate a decision whether to attend the associated event in the absence of an event description 110(5).

Other event data 110(N) may also be included. As used in this disclosure, letters in parenthesis such as "(N)" indicate an integer value. For example, the event data 110 may include a an indication of: a fee to attend the associated event, a password required to enter a building, a code required to bypass a gate or similar impediment to reach the event location 110(2), a dress code for the event, an alternate location or time if the event becomes cancelled due to inclement weather, a ticket for the event, item(s) a user 104 may be advised or required to bring depending on the nature of the event, and so forth.

The availability data 112 may include any item of current or historical data to determine an activity metric 118 associated with a user device 102. As described previously, one or more items of user data 114 may be used to determine a base activity metric 120 indicative of typical or expected behaviors of a user 104 associated with a user device 102. The availability data 112 may be used to determine one or more deviations from the base activity metric 120, which may indicate a likelihood or unlikelihood of the availability of a user 104 to attend events. The activity metric 118 may include a qualitative or quantitative expression of a user's 104 potential availability to attend one or more events or to receive information regarding one or more events.

FIG. 2 depicts the availability data 112 including a device location 112(1). The device location 112(1) may include a current location of a user device 102. In some implementations, the device location 112(1) may include a historic location of the user device 102 or an intended future location of the user device 102, such as an address determined from an electronic calendar or task list associated with the user device 102. The device location 112(1) may be used to determine whether a user device 102 is positioned at a location indicative of user availability. For example, determination of a device location 112(1) indicating a workplace or a bedroom of a user 104 may indicate a lack of availability, while determination of a device location 112(1) indicating a couch in the user's 104 living room, a park bench, or a coffee shop may indicate availability.

The availability data 112 may also include calendar data 112(2). Calendar data 112(2) may include data determined from a calendar or task list associated with a user device 102 or any other source of data that indicates occupied or unoccupied past, present, or future dates and times. For example, a user device 102 that routinely includes occupied times on weekdays, after 8:00 P.M. may be determined as unavailable during corresponding time periods, independent of the presence or absence of an item on a calendar associated with the user device 102. Conversely, calendar data 112(2) that indicates a current or upcoming block of unoccupied time may indicate user availability. In some implementations, calendar data 112(2) may be used in combination with other items of data, such as the device location 112(1). For example, if the calendar data 112(2) indicates a future time at which a user 104 is scheduled to be present at a location, a transit time associated with reaching that location from the current location of the user device 102 may affect the activity metric 118.

In some implementations, the availability data 112 may include one or more purchase activities 112(3) associated with a user device 102. For example, a current purchase of recreational beverages or recreational literature associated with a user device 102 may indicate user availability. The purchase activities 112(3) may be used in combination with other data items, such as the device location 112(1) or the calendar data 112(2). By way of example, a user 104 purchasing a cup of coffee while in transit to a place of employment may indicate a lack of availability, while the user 104 purchasing a cup of coffee during a time indicated as vacation in the calendar data 112(2), or at a location remote from the place of employment may indicate user availability.

Similarly, the availability data 112 may include one or more browsing activities 112(4) associated with a user device 102. For example, the availability data 112 may indicate that the user device 102 is currently being used to view or compose a message relating to the employment of a user 104 associated with the user device 102. The availability data 112 may indicate that the user 104 is currently actively engaged in a hobby corresponding to typical browsing activity determined from the user data 114. Such scenarios may indicate a lack of availability. Alternatively, the availability data 112 may indicate that the user device 102 is currently being used to browse recreational websites not associated with a user's 104 employment or hobbies, indicating potential user availability.

In some implementations, the availability data 112 may include one or more searching activities 112(5) associated with a user device 102. For example, the availability data 112 may indicate that the user device 102 is currently providing or has recently provided one or more search queries relating to recreational activities, indicating user availability. Alternatively, the availability data 112 may indicate that the user device 102 is currently providing or has recently provided one or more search queries relating to an employment activity of a user 104, indicating a lack of availability.

The availability data 112 may include one or more user availability preferences 112(6). User availability preferences 112(6) may include user input data regarding selected dates or times during which a user 104 is willing or unwilling to attend events. For example, a user device 102 may provide user availability preferences 112(6) indicating that a user 104 associated with the user device 102 is unwilling to attend events on weekdays, between the hours of 8:00 P.M. and 8:00 A.M. Similarly, a user device 102 may provide user availability preferences 112(6) indicating that the user 104 is willing to attend events daily, between the hours of 12:00 P.M. and 1:00 P.M. The user availability preferences 112(6) may include repeating times during which the user 104 is available or unavailable, such as every Monday. The user availability preferences 112(6) may include specific times, such as Saturday, Sep. 6, 2014, from 2:00 P.M. to 2:30 P.M. In some implementations, the user availability preferences 112(6) may be used to determine the activity metric 118 associated with a user device 102, independent of any other items of availability data 112. For example, a user 104 that has indicated an unwillingness to attend events or receive information regarding events between the hours of 12:00

P.M. and 1:00 P.M. may not receive event data 110, even when the device location 112(1), calendar data 112(2), purchase activity 112(3), browsing activity 112(4), or searching activity 112(5) may indicate potential user availability.

The availability data 112 may also include one or more user inputs 112(7). For example, a user 104 may manually indicate availability or unavailability, such as by accessing a webpage, an application, or another type of medium or platform associated with the events, to request a recommendation of an event or to search existing events. In some embodiments, the user inputs 112(7) may be used to determine the activity metric 118 associated with a user device 102, independent of any other items of availability data 112. For example, if a user input 112(7) indicating current user availability has been received, the activity metric 118 may indicate user availability even when the user availability preference(s) 112(6), the calendar data 112(2), or other items of availability data 112 may indicate a lack of availability.

The availability data 112 may include one or more user search queries 112(8). In some implementations, a user 104 may access a webpage, an application, or another type of medium or platform associated with the events to manually provide search queries to the platform to locate one or more suitable events. The presence of user search queries 112(8) may indicate user availability independent of other items of activity data 112.

In some implementations, the availability data 112 may include user biomedical data 112(9). For example, a user's 104 pulse rate, breath rate, or temperature may be determined using one or more biomedical sensors. User biomedical data 112(9) obtained using such sensors may be used to determine whether a user 104 is currently sleeping, ill, exercising, under stress, and so forth, any of which may indicate a lack of user availability. Similarly, user biomedical data 112(9) may indicate that a user 104 is wakeful, calm, and healthy, which in combination with other items of activity data 112, may indicate user availability.

Other availability data 112(A) may also be present. For example, one or more events may be flagged as an emergent situation, such as a fire, a riot, severe weather, and so forth. Notice of emergent situations may be provided to user devices 102 within a threshold distance of the location of the emergent situation independent of other items of availability data 112. Other availability data 112(A) may include motion data relating to a user device 102. For example, the presence or rate of movement associated with a user device 102, determined using an accelerometer, gyroscope, or other type of motion sensor, may indicate user availability. Continuing the example, a user 104 associated with a user device 102 in motion may be assumed to be awake. The rate of motion for a user 104 may be used to determine whether a user 104 is currently operating a vehicle, exercising, ill, and so forth. A determination of user 104 movement following a period of no movement or minimal movement may indicate that a user 104 that was previously sleeping, at a workstation, or otherwise occupied may now be available.

The user data 114 may include any item of current or preexisting data relating to a user device 102 or to a user 104 associated therewith. For example, one or more items of user data 114 may be compared with one or more items of event data 110 to determine selected event data 124 that may be of interest to a user 104 associated with the user data 114. In some implementations, the user data 114 may be used to determine a user profile 126 without requiring input from a user 104.

FIG. 2 depicts the user data 114 including a location history 114(1) associated with a user 104 or user device 102. The location history 114(1) may include, but is not limited to, one or more locations previously occupied by the user device 102, the dates and times the user device 102 was present at the location(s), or the length of time the user device 102 remained at the location(s). The location history 114(1) may also include indications regarding a location of a user's 104 home, workplace, and so forth. The location history 114(1) may further include a type or category corresponding to one or more of the locations, such as grocery stores, coffee shops, gasoline stations, residences, and so forth. The location history 114(1) may be used to determine events that may be of interest to a user 104 by comparing the event location 110(2) to locations previously occupied by the user device 102. For example, events having an event location 110(2) proximate to the home or workplace of a user 104 may be prioritized over events remote from the home or workplace of the user 104. Similarly, events having an event location 110(2) at or within a threshold distance of one or more locations frequently occupied by a user device 102 may be provided to the user device 102 over other events. Events having an event location 110(2) with the same or similar type or category as one or more locations frequently occupied by a user device 102 may be provided to the user device 102. In some implementations, events having an event location 110(2) at locations previously occupied by the user device 102, though not recently occupied by the user device 102, may be provided to the user device 102. For example, selected event data 124 may be provided to a user device 102 concurrently with an indication that the user 104 associated with the user device 102 has not visited a specific location for a certain time period.

The user data 114 is also shown including time data 114(2). Time data 114(2) may include historical calendar items, items determined from a task list associated with a user device 102, and so forth. For example, previously scheduled calendar items associated with a user device 102 may indicate a greater likelihood that a user 104 will attend an event scheduled on weekends or during night hours. The time data 114(2) may be used to determine events that may be of interest to a user 104 by comparing the event time 110(3) to the time data 114(2). For example, events having an event time 110(3) during which a user 104 has historically attended may be provided to the user device 102 over other events having different event times 110(3). In some implementations, events having an event time 110(3) during which a user 104 has historically lacked any scheduled activities may be provided over other events due to the historical propensity of a user 104 to be unoccupied during such times.

The user data 114 may include a purchase history 114(3). The purchase history 114(3) may include one or more items or types of items previously purchased by a user 104. For example, one or more items may be purchased using the user device 102, a card, account, other device(s) associated with a user 104 of the user device 102, and so forth. In some implementations, the purchase history 114(3) may be compared with current purchase activities 112(3) of a user 104 to determine user availability. For example, purchase activity 112(3) that deviates from items purchased or times of purchases indicated in the purchase history 114(3) may indicate availability or unavailability of a user 104 to attend or receive information regarding one or more events.

The user data 114 may similarly include a browsing history 114(4). The browsing history 114(4) may include one or more websites accessed by the user device 102, one or more links, buttons, advertisements, and so forth that were selected using the user device 102 as well as other similar data indicative of the browsing habits of a user 104 associated with the user device 102. The browsing history 114(4) may relate to browsing performed using the user device 102, or using other devices or accounts associated with a user 104 of the user device 102.

The user data 114 may also include a search history 114(5). The search history 114(5) may include one or more search queries previously input using the user device 102 or other devices or accounts associated with a user 104 of the user device 102.

The purchase history 114(3), browsing history 114(4), or search history 114(5) may be compared with one or more items of the event data 110 to determine selected event data 124 that may be of interest to a user 104. For example, an event may be provided to the user device 102 if the event includes an event category 110(4) associated with an item or type of item previously purchased by a user 104 or previously researched by a user 104. Events having an event location 110(2) where items or features associated with the purchase history 114(3), browsing history 114(4), or search history 114(5) are available may be provided to the user device 102 over other events.

The user data 114 may also include user device data 114(6). The user device data 114(6) may include information regarding one or more characteristics of a user device 102. The user device data 114(6) may also include information regarding other devices associated with a user 104 of the user device 102. In some implementations, the user device data 114(6) may include one or more programs or one or more items of data stored in association with a user device 102. The user device data 114(6) may also include one or more programs currently or previously executed by the user device 102. The user device data 114(6) may be compared with one or more portions of the event data 110 to determine events suitable for provision to the user device 102. For example, events having an event category 110(4) that relate to a type of user device 102, or one or more programs or items of data associated with the user device 102, may be provided to the user device 102. Similarly, events having an event location 110(2) where programs, data, or user devices 102 determined from the user device data 114(6) are available may be provided to the user device 102 in favor of other events.

In some implementations, the user data 114 may include one or more user event preferences 114(7). For example, a user 104 may input one or more event categories 110(4), event locations 110(2), event times 110(3), keywords of interest in event descriptions 110(5), and so forth, as user event preferences 114(7). Any of the input user event preferences 114(7) may be indicated as an item of interest to a user 104 or as an item of disinterest to the user 104. For example, event data 110 that corresponds to user event preferences 114(7) indicated as being of interest may be provided to the user device 102, independent of whether other items of user data 114 or event data 110 may indicate that the associated event may be of disinterest. Similarly, event data 110 that corresponds to user event preferences 114(7) indicated as being of disinterest may not be provided to the user device 102, independent of whether other items of user data 114 or event data 110 may indicate that the associated event may be of interest.

FIG. 2 also depicts the user data 114 including user event history 114(8). The user event history 114(8) may include one or more events at which a user device 102 or other device associated with a user 104 was previously present, one or more events the user device 102 or other device associated with the user 104 indicated as interesting or disinteresting, one or more events that the user 104 rated or reviewed positively or negatively, and so forth. Events having one or more items of event data 110 similar to that of events attended by a user 104 may be provided to the user device 102 over other events. Similarly, events having wholly dissimilar event data 110 or one or more items of event data 110 that are mutually exclusive with the events previously attended by a user 104 may not be provided to the user device 102. For example, if a user has routinely indicated disinterest for multiple events provided to a user device 102, when each of the events was scheduled to occur on a Saturday, subsequent events having a similar event time 110(3) may not be provided to the user device 102.

The user data 114 may also include a user identity 114(9). The identity of a user 104 may be used to affect a rating metric 130 associated with one or more events originated by the user 104 or with one or more events for which the user 104 provides rating data 132. The user data 114 may further include user account data 114(10), which may include an age or type of account associated with a user 104. The user data 114 may also include user financial data 114(11), which may include account information relating to an individual or business account that evinces legitimacy of the account or the user 104. The user financial data 114(11) may also include account information that indicates the value of items purchased by a user 104 of the account. For example, the user data 114 may indicate that an event was originated by an anonymous user account, created one day ago, which may negatively affect the rating metric 130 associated with the event. Conversely, the user identity 114(9) may indicate that an event was originated by a sizeable or well-known business or by a user 104 with an established purchase history 114(3) and a user account of significant age, which may positively affect the rating metric 130. The user data 114 may be used to weight rating data 132 received from a user 104. For example, a user 104 having an established user account of a significant age, a user event history 114(8) indicating that the user 104 has attended numerous events previously, and so forth, may result in the rating data 132 received from that user 104 more significantly affecting the rating metric 130 than rating data 132 received from one or more other users 104.

Other user data 114(D) may also be present. For example, other user data 114(D) may include events previously originated by a user device 102, ratings or reviews of one or more events generated by a user 104 of the user device 102, and so forth. The other user data 114(D) may also include content generated by the user device 102 or another device associated with the user 104 on other platforms, forums, and so forth. Keywords present in the content may be used to identify potential events of interest or disinterest to the user 104.

The rating data 132 may include any manner of data reflective of one or more experiences of users 104 relative to selected event data 124. The rating data 132 may be processed by the rating metric module 128 to generate a rating metric 130 associated with one or more events. The rating metric 130 may represent an overall qualitative or quantitative assessment of an event by one or more users 104 that may be provided to user devices 102 concurrently with the selected event data 124. In some implementations, the rating metric 130 may affect presentation of the selected event data 124. For example, the rating metric 130 may determine the order in which a list of events is presented, or the rating metric 130 may cause the inclusion or exclusion of one or more events from selection by the event selection module 122. One or more user event preferences 114(7) may reference the rating metric 130 of events. For example, a user 104 may elect to only receive information regarding events having a rating metric 130 that equals or exceeds a certain quantitative or qualitative value.

Rating data 132 may include attendance data 132(1), which may include an indication regarding whether a user 104 attends an event or refrains from attending the event. For example, at or proximate to the event time 110(3), the current location of a user device 102 may be determined. If the current location of the user device 102 is at or within a threshold distance of the event location 110(2), the attendance data 132(1) may positively affect the rating metric 130 associated with the selected event data 124. Similarly, the absence of a user device 102 from an event location 110(2) may negatively affect the rating metric 130. In some implementations, the attendance data 132(1) may include an indication regarding a level of interest associated with the selected event data 124. For example, a user 104 may input an indication of significant interest in an event while being unable to attend the event, which may positively affect the rating metric 130 associated with the event. Similarly, an indication of disinterest input by a user 104 may negatively affect the rating metric 130. The effect of the attendance data 132(1) on the rating metric 130 may be weighted based on the user data 114 of the user 104 providing the attendance data 132(1). For example, the attendance of a user 104 at an event location 110(2) where the user 104 is habitually present, independent of the presence or absence of an event, may not significantly impact the rating metric 130. In comparison, the attendance of a user 104 unlikely to be present at the event location 110(2) may more strongly affect the rating metric 130.

The rating data 132 may include a dwell time 132(2) associated with an event. As described previously, in some implementations, a base dwell time associated with an event may be determined. For example, an average dwell time for a plurality of users 104 or user devices 102 for a given event may be calculated to determine the base dwell time. In other implementations, the average dwell time for user devices 102 that have provided other types of rating data 132, such as manually-input ratings or reviews, may be used to determine the base dwell time. User devices 102 that remain within a threshold distance of an event location 110(2) for a dwell time 132(2) that exceeds the base dwell time may positively affect the resulting rating metric 130, while user devices 102 that remain for a dwell time 132(2) less than the base dwell time may negatively affect the rating metric 130. In some implementations, the extent to which the dwell time 132(2) exceeds or falls short of the base dwell time may determine the magnitude to which the rating metric 130 is affected. The dwell time 132(2) is one example of various metrics that may be determined. In other implementations, an amount of motion of one or more users 104, an intensity of sound at an event location 110(2), a number of individuals present at an event location 110(2), ambient light at an event location 110(2), and so forth, may be determined using sensors present in one or more user devices 102. The relative value between a metric associated with an individual user 104 and the base value of that metric may be used to affect the overall rating metric 130 of the event or to modify the base value corresponding to any individual metrics. Values for one or more metrics may be provided to users 104 concurrently with the selected event data 124 in addition to or in lieu of the rating metric 130.

The rating data 132 may further include user ratings and reviews 132(3). User ratings and reviews 132(3) may include any quantitative or qualitative input from a user device 102 regarding one or more characteristics of an event. For example, a user interface associated with the provision of selected event data 124 to a user device 102 may include one or more fields, buttons, links, and so forth, by which a user 104 may assign a rating to an event or provide a review of one or more characteristics of the event. The rating metric 130 may be determined, at least in part, from received user ratings. For example, an average rating, calculated from ratings received from a plurality of users 104, may at least partially determine the rating metric 130. In some implementations, individual ratings provided by individual users 104 may be weighted based on a user identity 114(9), user event history 114(8), or other items of user data 114. User reviews may be processed, such as through use of text-recognition software, to determine content reflective of positive or negative user experiences. Content indicative of positive user experiences may positively affect the rating metric 130, while content indicative of negative user experiences may negatively affect the rating metric 130. The effect of user ratings and reviews 132(3) on the rating metric 130 may be weighted based on the user data 114 of the user 104 providing the user ratings and reviews 132(3). For example, user ratings and reviews 132(3) received from a user 104 having no user event history 114(8) may affect the rating metric 130 less significantly than user ratings and reviews 132(3) received from a user 104 that has attended numerous events previously.

The rating data 132 may also include image data 132(4), which may include one or more images or videos acquired by a user device 102 while present at an event location 110(2). The image data 132(4) may also be acquired by other devices located at or near the event location 110(2). In some implementations, the number of images or videos acquired by a user device 102 may affect the rating metric 130 associated with an event. In other implementations, the images or videos may be processed, such as by using image analysis or facial recognition software, to determine content indicative of positive or negative user experiences. Image data 132(4) indicating positive user experiences may positively impact the rating metric 130, while image data 132(4) indicating negative user experiences may negatively impact the rating metric 130.

FIG. 2 also depicts the rating data 132 including audio data 132(5), which may include one or more audio recordings or audio components of video recordings acquired by a user device 102 while present at an event location 110(2). The audio data 132(5) may also be acquired by other devices located at or near the event location 110(2). In some implementations, the number of audio recordings acquired by a user device 102 may affect the rating metric 130 associated with an event. In other implementations, the audio data 132(5) may be processed, such as by using speech recognition software, to determine content indicative of positive or negative user experiences. Audio data 132(5) indicating positive user experiences may positively impact the rating metric 130, while audio data 132(5) indicating negative user experiences may negatively impact the rating metric 130. In some implementations, audio data 132(5) may include samples of sound received from an event location 110(2) used to determine intensity of sound that may not necessarily include speech. For example, a sample of sound having a length of 20 milliseconds (ms) may be recorded at an event location 110(2) every 200 ms, and the sample may be processed to determine an intensity of sound present at the event location 110(2).

The rating data 132 may further include message data 132(6), which may include one or more textual messages, such as SMS, e-mail, and so forth. Textual messages may include images, video, or audio components in addition to text. The message data 132(6) may also include one or more audio messages or video messages. For example, the audio messages may include telephone calls, recorded voice messages, and so forth. The video messages may include, for example, content generated through use of a video chat interface. In some implementations, the number of messages generated or received by a user device 102 may affect the rating metric 130 associated with an event. In other implementations, the message data 132(6) may be processed, such as by using image, audio, or text analysis software, to determine content indicative of positive or negative user experiences. Message data 132(6) indicating positive user experiences may positively impact the rating metric 130, while message data 132(6) indicating negative user experiences may negatively impact the rating metric 130.

Other rating data 132(R) may also be included. For example, ratings associated with an event originator or an event location 110(2), independent of a specific event, may affect a rating metric 130 of the corresponding event. In some implementations, the other rating data 132(R) may include additional event data, received from a separate user 104 or user device 102 than previously received event data. For example, the receipt of event data 110 corresponding to a preexisting event from multiple users 104 may increase the accuracy or legitimacy of the event data 110. Other rating data 132(R) may include motion data, indicative of an amount of motion at an event location 110(2), an intensity of sound determined from audio data 132(5), a number of individuals present determined from image data 132(4), ambient light determined from image data 132(4), and so forth.

Figure 3:
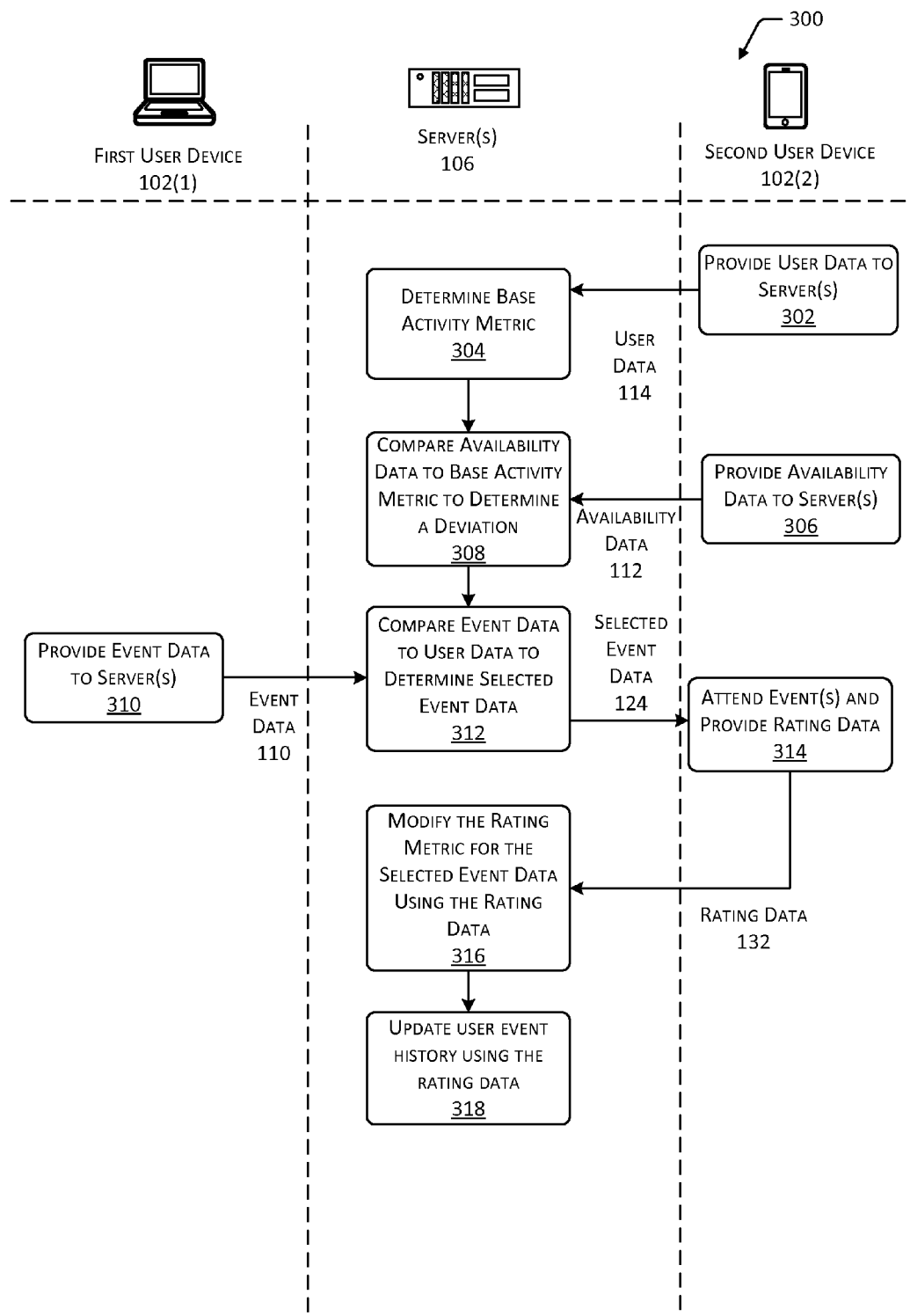
FIG. 3 illustrates one possible implementation of the flow of data between a first user device, one or more servers, and a second user device.

FIG. 3 illustrates a flow diagram of one possible implementation 300 of a flow of data between a user device 102(1), one or more servers 106, and a user device 102(2).

Block 302 illustrates the user device 102(2) providing user data 114 to the server(s) 106. In some implementations, the user data 114 may be stored on the server(s) 106. In other implementations, the user data 114 may be determined by the server(s) 106 or by other computing devices without requiring provision of the user data 114 from the user device 102(2). For example, a computing device associated with a cellular network may provide location history 114(1) in implementations where the user device 102(2) is connected to the cellular network.

Block 304 represents the server(s) 106 determining a base activity metric 120 associated with the user device 102(2) from the user data 114. The base activity metric 120 may indicate expected locations of the user device 102(2) at various times, expected or typical purchase activities, expected or typical browsing or searching activities, and so forth. The activity metric module 116 may be configured to determine patterns in the user data 114 to generate the base activity metric 120.

Block 306 illustrates the user device 102(2) providing availability data 112 to the server(s) 106. In some implementations, the availability data 112 may be stored on the sever(s) 106. In other implementations, the availability data 112 may be determined from the user device 102(2) by the server(s) 106 or by other computing devices without requiring provision of the availability data 112 from the user device 102(2). The availability data 112 may include a device location 112(1), purchase activity 112(3), browsing activity 112(4), searching activity 112(5), and so forth, associated with the user device 102(2).

Block 308 compares the availability data 112 to the base activity metric 120 determined from the user data 114 to determine one or more deviations from the base activity metric 120. For example, the activity metric module 116 may be configured to determine an activity metric 118 associated with the user device 102(2) by determining deviations from the base activity metric 120 that indicate availability or unavailability. One or more of deviations in a device location 112(1), tasks or engagements indicated in calendar data 112(2), current purchase activity 112(3), browsing activity 112(4), searching activity 112(5), and so forth, may be weighted, determined as a positive or negative indicator of availability, and processed to determine the activity metric 118. Determination of one or more deviations from the base activity metric 120 may result in the provision of selected event data 124 to the user device 102(2).

Block 310 represents the user device 102(1) providing event data 110 to the server(s) 106. The event data 110 may include one or more of an event identifier 110(1), event location 110(2), event time 110(3), event category 110(4), event description 110(5), and so forth. The event data 110 may correspond to an event created by a user 104 of the user device 102(1), or in some implementations, the event data 110 may correspond to a preexisting event.

Block 312 represents the server(s) 106 comparing one or more portions of the event data 110 to one or more portions of the user data 114 associated with the user device 102(2). Such a comparison may determine selected event data 124 suitable for provision to the user device 102(2). For example, events having an event location 110(2) proximate to one or more locations present in the location history 114(1) of the user data 114 may be provided to the user device 102(2) as selected event data 124. Events having event categories 110(4) or event descriptions 110(5) associated with items determined from the purchase history 114(3), browsing history 114(4), or search history 114(5) of the user data 114 may be provided, as selected event data 124, to the user device 102(2). Events having an event time 110(3) corresponding to dates and times during which a user 104 is likely to be available and attend an event, determined from the time data 114(2) may be provided to the user device 102 as selected event data 124. Further, events corresponding to user event preferences 114(7) or corresponding to previously-attended events present in the user event history 114(8) may be provided to the user device 102(2) as selected event data 124.

In some implementations, presentation of selected event data 124 to the user device 102(2) may include an ordered list of events, in which events having event data 110 that more strongly correspond with user data 114 may be listed prior to events having event data 110 that correspond less with the user data 114. The order of the listed events may be determined, at least in part, using a rating metric 130 associated with one or more of the events. In other implementations, presentation of selected event data 124 to the user device 102(2) may include events that correspond to at least a certain portion of the user data 114, such as by 50%, while events that correspond to a smaller portion of the user data 114 may be omitted from presentation. The provision or omission of one or more events may be determined, at least in part, using the rating metric 130 associated with the respective events.

Block 314 represents a user 104 associated with the user device 102(2) attending one or more events and providing rating data 132 related thereto. Rating data 132 may include any data to generate or modify a rating metric 130 associated with an event. Attendance of a user 104 at an event may be determined via a location of the user device 102(2) or a location of one or more other devices associated with a user 104 of the user device 102(2). In some implementations, the presence or absence of the user device 102(2) at or within a threshold distance of the event location 110(2) may constitute rating data 132. In other implementations, a length of time that the user device 102(2) remains at or within a threshold distance of the event location 110(2) may constitute rating data 132. In some implementations, the user device 102(2) or another device associated with the user 104 may provide ratings or reviews associated with an event, which may constitute rating data 132. In other implementations, the user device 102(2) may generate or record one or more images, videos, audio files, or messages while present at the event location 110(2), which may constitute rating data 132. Rating data 132 may also include images, videos, audio files, or messages generated or recorded while not present at the event location 110(2), having content relating to the selected event data 124.

Block 316 represents the server(s) 106 modifying the rating metric 130 associated with selected event data 124 using the rating data 132 received from the user device 102(2). By way of example, attendance of the user device 102(2) at an event or an indication of interest in an event may positively affect the rating metric 130 associated therewith, while lack of attendance or an indication of disinterest may negatively affect the rating metric 130. An average or expected length of time (e.g., a base dwell time) to remain at an event location 110(2) may be determined from other attendees. Presence of the user device 102(2) at or within a threshold distance of the event location 110(2) for a length of time exceeding the base dwell time may positively affect the rating metric 130. Presence of the user device 102(2) for a length of time less than the base dwell time may negatively affect the rating metric 130. Generation of a threshold number of messages, images, videos, or audio files regarding the event may positively affect the rating metric 130, while generation of a number of images, messages, videos, or audio files less than the threshold number may negatively affect the rating metric 130. In some implementations, the messages, images, videos, or audio files generated by a user device 102 or other device associated with the event location 110(2) may be processed to determine content therefrom. Content indicative of a positive user experience may positively affect the rating metric 130, while content indicative of a negative user experience may negatively affect the rating metric 130.

The rating metric 130 determined for selected event data 124 may be stored in association therewith and provided to subsequent user devices 102. The rating metric 130 may affect the presentation of one or more events.

Block 318 updates the user event history 114(8) associated with the user 104 of the user device 102(2), using the rating data 132 generated by the user device 102(2). For example, if the rating data 132 indicates disinterest or a negative user experience, subsequent events having an event category 110(4), event location 110(2), or other event data 110(N) identical or similar to the event associated with the selected event data 124 may not be provided to the user 104. Conversely, if the rating data 132 indicates interest or a positive user experience, subsequent events having event data 110 identical or similar to the event associated with the selected event data 124 may be preferentially provided to the user 104.

Figure 4:
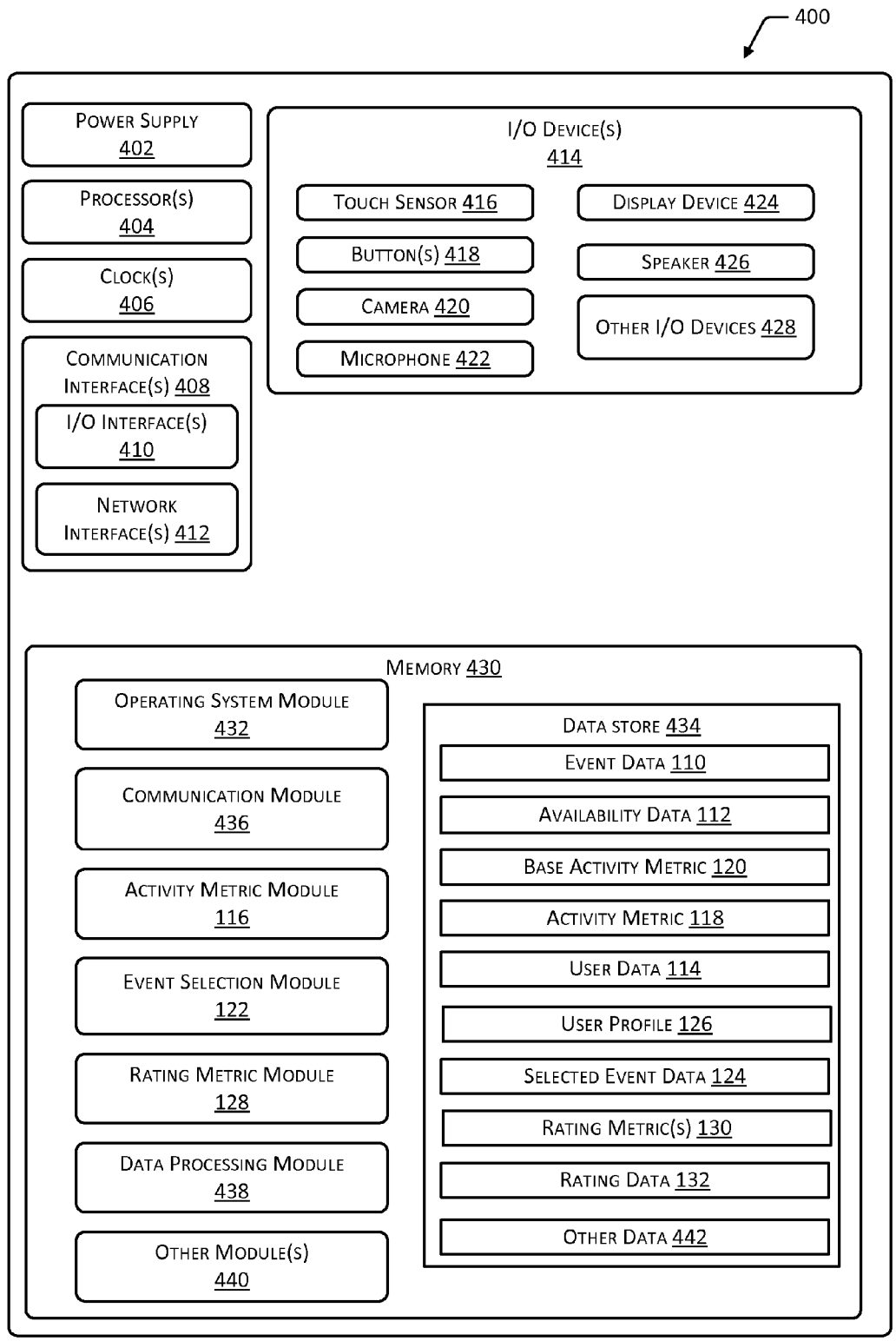
FIG. 4 is a block diagram illustrating a computing device.

FIG. 4 illustrates a block diagram of a computing device 400 configured to support operation of the system 100. The computing device 400 may include one or more user devices 102, servers 106, or other computing devices 400 in communication with the user devices 102 or with the server(s) 106. For example, the system 100 shown in FIG. 1 depicts a user device 102(1) and a user device 102(2) in communication with one or more servers 106. In other implementations, a user device 102(1) may communicate directly with a user device 102(2) or other user devices 102 via one or more local networks 108. As such, one or more of the depicted modules or data objects included in the computing device 400 may be stored in one or more user devices 102, servers 106, or other computing devices 400 in communication therewith.

One or more power supplies 402 may configured to provide electrical power suitable for operating the components in the computing device 400. In some implementations, the power supply 402 may include a rechargeable battery, fuel cell, photovoltaic cell, power conditioning circuitry, and so forth.

The computing device 400 may include one or more hardware processor(s) 404 (processors) configured to execute one or more stored instructions. The processor(s) 404 may include one or more cores. One or more clocks 406 may provide information indicative of date, time, ticks, and so forth. For example, the processor(s) 404 may use data from the clock 406 to generate a timestamp, trigger a preprogrammed action, and so forth.

The computing device 400 may include one or more communication interfaces 408 such as input/output (I/O) interfaces 410, network interfaces 412, and so forth. The communication interfaces 408 may enable the computing device 400, or components thereof, to communicate with other devices or components. The I/O interfaces 410 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 410 may couple to one or more I/O devices 414. The I/O devices 414 may include any manner of input device or output device associated with a user device 102, server 106, or other computing device 400 associated therewith. The I/O devices 414 may include input devices such as a touch sensor 416, one or more buttons 418, a camera 420, a microphone 422, a keyboard, a mouse, a scanner, and so forth. The I/O devices 414 may also include output devices such as one or more of a display device 424, a speaker 426, a printer, a haptic device, and so forth. Other I/O devices 428 may include a location sensor, such as a Global Positioning Satellite (GPS) transmitter or receiver, or one or more motion sensors, such as an accelerometer or a gyroscope. In some implementations, the other I/O devices 428 may further include a barometer or altimeter, usable to measure air pressure, which may be used to determine a current altitude of the computing device 402. Measurement using a barometer may enhance the accuracy of determinations of a location of the computing device 402. For example, the barometer may be used to help determine the floor of a multi-story building at which the computing device 402 is located. In some implementations, the I/O devices 414 may be physically incorporated with the computing device 400 or may be externally placed.

The network interfaces 412 may be configured to provide communications between the computing device 400 and other devices, such as the I/O devices 414, routers, access points, and so forth. The network interfaces 412 may include devices configured to couple to one or more networks 108 including LANs, wireless LANs, WANs, wireless WANs, and so forth. For example, the network interfaces 412 may include devices compatible with Ethernet, Wi-Fi™, Bluetooth®, ZigBee®, Z-Wave, 3G, 4G, LTE, and so forth.

The computing device 400 may include one or more busses or other internal communications hardware or software that allows for the transfer of data between the various modules and components of the computing device 400.

As shown in FIG. 4, the computing device 400 may include one or more memories 430. The memory 430 may include one or more computer-readable storage media (CRSM). The CRSM may be any one or more of an electronic storage medium, a magnetic storage medium, an optical storage medium, a quantum storage medium, a mechanical computer storage medium, and so forth. The memory 430 provides storage of computer-readable instructions, data structures, program modules, and other data for the operation of the computing device 400. A few example functional modules are shown stored in the memory 430, although the same functionality may alternatively be implemented in hardware, firmware, or as a system on a chip (SOC).

The memory 430 may include one or more operating system (OS) modules 432. The OS module 432 may be configured to manage hardware resource devices such as the I/O interfaces 410, the network interfaces 412, the I/O devices 414, and to provide various services to applications or modules executing on the processors 404. The OS module 432 may implement a variant of the FreeBSD™ operating system as promulgated by the FreeBSD Project; UNIX™ or a UNIX-like operating system; a variation of the Linux™ operating system as promulgated by Linus Torvalds; the Windows® operating system from Microsoft Corporation of Redmond, Wash., USA; or other operating systems.

A data store 434 and one or more of the following modules may also be stored in the memory 430. The modules may be executed as foreground applications, background tasks, daemons, and so forth. The data store 434 may use a flat file, database, linked list, tree, executable code, script, or other data structure to store information. In some implementations, the data store 434 or a portion of the data store 434 may be distributed across one or more other devices including the computing devices 400, network attached storage devices, and so forth.

A communication module 436 may be configured to establish communications with one or more of other computing devices 400, such as audio or video devices present at an event location 110(2), user devices 102, servers 106, I/O devices 414, or other devices. The communications may be authenticated, encrypted, and so forth.

The memory 430 may also store the activity metric module 116. The activity metric module 116 may be configured to process user data 114 to determine a base activity metric 120. The user data 114 may be received or determined from one or more user devices 102, from other computing devices 400, or stored in one or more servers 106. In some implementations, user data 114, such as a purchase history 114(3), may be determined from servers 106 or other computing devices 400 associated with users who are merchants, in addition to or in lieu of information determined from user devices 102 or server(s) 106 implementing the system 100. In other implementations, user data 114, such as location history 114(1), may be determined from servers 106 or other computing devices 400 associated with device manufacturers or network service providers, in addition to or in lieu of information determined from user devices 102 or server(s) 106 implementing the system 100. The activity metric module 116 may be further configured to process availability data 112 received or determined from one or more user devices 102 or from other computing devices 400 in communication therewith. The activity metric module 116 may compare the availability data 112 with the base activity metric 120 to determine one or more deviations from the base activity metric 120 that may indicate user availability or a lack thereof. Deviations from the base activity metric 120 may be quantified or qualified as an activity metric 118.

The memory 430 is also depicted as having an event selection module 122 stored therein. The event selection module 122 may be configured to process user data 114 to determine a user profile 126 or to process similar information to determine selected event data 124 suitable for provision to a user device 102 or other computing devices 400 associated with a user 104 of the user device 102. At least a portion of the user data 114 or the user profile 126 may be compared to at least a portion of the event data 110 to determine the selected event data 124, which may be provided to one or more user devices 102 using the communication module 436.

The memory 430 is further depicted as having a rating metric module 128 stored therein. The rating metric module 128 may process rating data 132 received from one or more user devices 102 or other computing devices 400 to produce rating metrics 130 associated with the selected event data 124. In some implementations, the rating metric module 128 may include one or more of image processing software, audio processing software, message processing software, or other elements to determine content from image data 132(4), audio data 132(5), or message data 132(6) present in the rating data 132. In other implementations, a data processing module 438 in the memory 430 may process the rating data 132 or other data received by the computing device 400.

The data processing module 438 may be configured to receive one or more of the event data 110, the availability data 112, the user data 114, or the rating data 132. The data processing module 438 may also store the received data in a manner that enables querying or processing thereof. The data processing module 438 may be configured to process data to determine content that may be used by other modules. For example, the data processing module 438 may process user data 114 to generate the user profile 126. In some implementations, the data processing module 438 may process at least a portion of the user data 114 or event data 110 to determine content usable by the event selection module 122 to determine the selected event data 124. Similarly, the data processing module 438 may process availability data 112 or user data 114 to determine content usable by the activity metric module 116 to determine the base activity metric 120 or the activity metric 118. Further, the data processing module 438 may process rating data 132, including image data 132(4), audio data 132(5), or message data 132(6), to determine content usable by the rating metric module 128 to determine the rating metric(s) 130. In one implementation, the image processing performed by the rating metric module 128 or the data processing module 438 may be performed at least in part by using one or more tools available in the OpenCV library as developed by Intel Corporation of Santa Clara, Calif., USA; Willow Garage of Menlo Park, Calif., USA; and Itseez of Nizhny Novgorod, Russia, with information available at www.opencv.org. For example, the OpenCV library may be used to detect faces, determine a relative position of facial features such as eyes, mouth, nose, and so forth.

In some implementations, the data processing module 438 may determine a current location of one or more user devices 102 and cause actuation of audio or video recording elements within the user devices 102 or in communication with the computing device 400. For example, responsive to an indication that a user device 102 is at or within a threshold distance of an event location 110(2), audio or video recording devices at the event location 110(2) or associated with one or more user devices 102 may be actuated.

Other modules 440 may also be present in the memory 430. For example, the other modules 440 may include a map generation module, which may generate a visual map interface displaying map indicia corresponding to the event locations 110(2). In some implementations, map indicia may include a feature such as a color, shape, pattern, and so forth, corresponding to the event time 110(3). In other implementations, map indicia may include a feature corresponding to the associated rating metric 130. Other data 442 may also be present in the data store 434 and may include data specific to one or more locations, such as other venues proximate to event locations 110(2); menus, reviews, or crime data relating to one or more event locations 110(2); and so forth.

In different implementations, different computing devices 400 may have different capabilities or capacities. For example, the server(s) 106 may have significantly more processor 404 capability and memory 430 capacity compared to the user devices 102.

Figure 5:
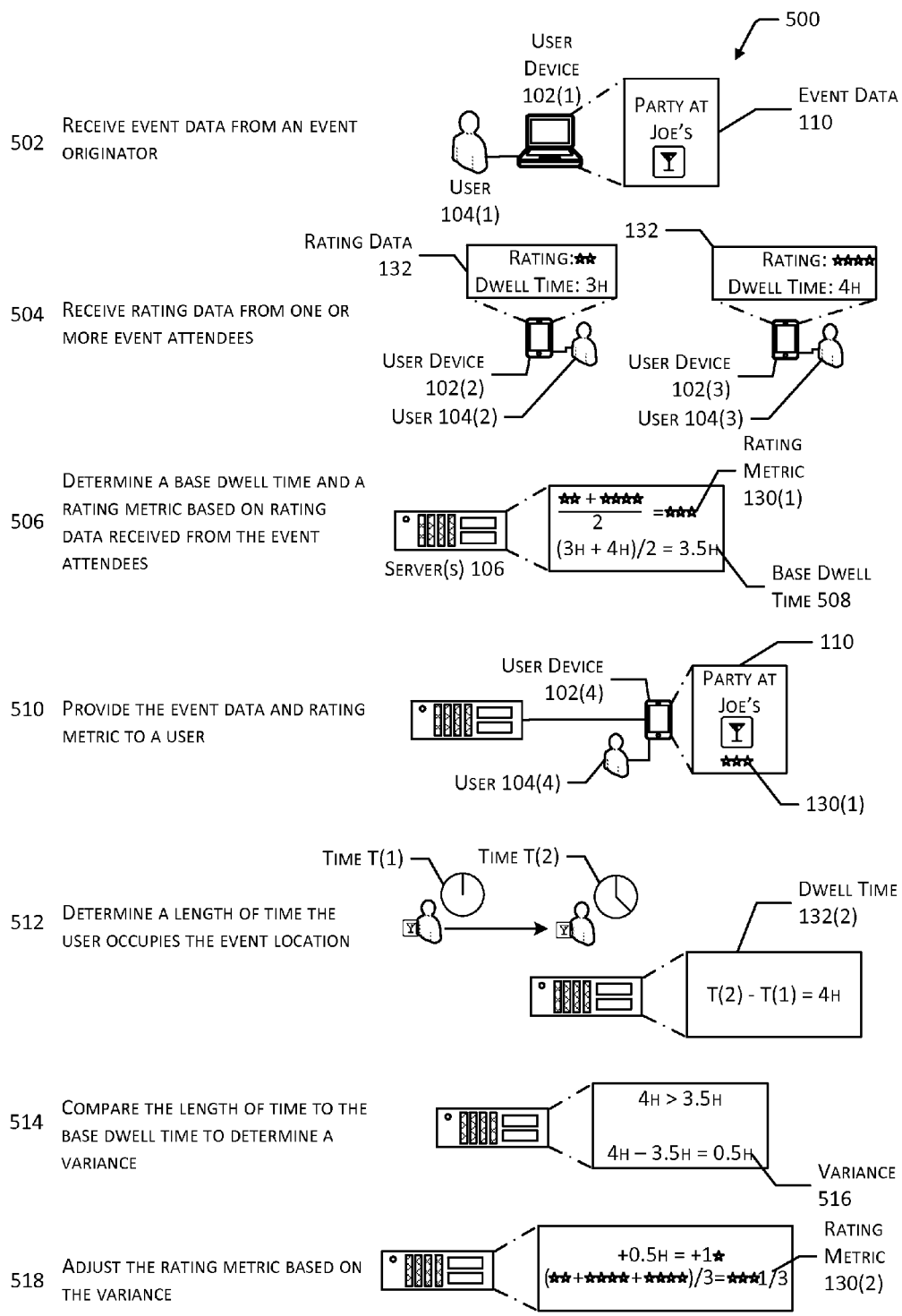
FIG. 5 illustrates a scenario for determining and adjusting a rating metric associated with a selected event.

FIG. 5 illustrates a scenario 500 in which a rating metric 130 for selected event data 124 may be determined from rating data 132 and modified based on a dwell time 132(2) associated with one or more users 104. Modification of the rating metric 130 for an event using dwell time 132(2) is a single example. Various metrics associated with an event may be measured and used to affect the overall rating metric 130 associated with the event. In some implementations, individual metrics, such as motion, sound, light, and so forth, may be determined and presented to a user 104 independently. In other implementations, activities of a user 104 while present at an event may be determined, such as through an activity log associated with a user device 102. A user's 104 interaction with a user device 102 may positively or negatively affect the rating metric 130 associated with an event depending on the nature of the event. For example, a user's 104 interaction with a user device 102 at a sporting event, concert, and so forth, may indicate disinterest or lack of attention directed toward the event. A user's 104 interaction with a user device 102 at a networking event or an event associated with the user device 102 may indicate interest in the event.

At 502, event data 110 is received from an event originator, such as the depicted user 104(1) using a user device 102(1). The event data 110 may include an event identifier 110(1), an event location 110(2), an event time 110(3), and so forth. The event data 110 may include one or more of text, images, videos, or audio data.

At 504, rating data 132 is received from one or more event attendees, such as the depicted user 104(2) and user 104(3), using a user device 102(2) and a user device 102(3), respectively. The rating data 132 may include user ratings and reviews 132(3) or a dwell time 132(2) associated with a user 104. In the depicted scenario, a user 104(2) is shown providing a user rating of two stars and having an associated dwell time 132(2) at the event location 110(2) of three hours. A user 104(3) is shown providing a user rating of four stars and having an associated dwell time 132(2) at the event location 110(2) of four hours.

At 506, a base dwell time 508 and a rating metric 130 are determined based on rating data 132 received from the event attendees such as the user 104(2) and user 104(3). One or more servers 106 are shown determining the rating metric 130 using an average user rating determined from the user 104(2) and user 104(3). Other formulae for determining the rating metric 130 may be used without departing from the scope of the present disclosure. For example, an individual user's 104 rating may be weighted based on the age of an associated user account, a purchase history of a user 104, an identity of the user 104, and so forth. The server(s) 106 are also shown determining the base dwell time 508 by using an average dwell time 132(2) determined from the user 104(2) and the user 104(3). Other methods for determining the base dwell time 508 may also be used. For example, the nature of an event may determine, at least in part, the base dwell time 508. Continuing the example, users 104 and associated user devices 102 may enter a restaurant or beverage shop, order food or drink, and then depart promptly, while other users 104 and associated user devices 102 may remain at the event location 110(2) for an extended length of time. Based on the nature of the event location 110(2) and the corresponding event, the base dwell time 508 may be determined using one or more of the shortest dwell times 132(2) recorded from users 102 that purchased one or more items while at the event location 110(2).

At 510, the event data 110 and rating metric 130(1) associated with the event are provided to a user 104(4) associated with a user device 102(4). The rating metric 130 may be provided in the form of text, images, video, or audio data. For example, the depicted rating metric 130 is provided as an image of three stars.

At 512, a length of time such as a dwell time 132(2) that the user 104(4) is within a threshold distance of the event location 110(2) is determined. For example, presence of the user 104(4) within the threshold distance of the event location 110(2) at a first time T(1) may be determined, and departure of the user 104(4) at a second time T(2) may subsequently be determined. In other implementations, the user 104(4) may manually indicate arrival at the event location 110(2) or departure therefrom. Receipt of a manual indication of the user's 104(4) presence at an event location 110(2) may more strongly affect the rating metric 130 due to the fact that a manual indication of event attendance ensures that the user 104(4) is not present at the event location 110(2) for reasons unrelated to the event. For example, a user 104 attending an event location 110(2) while lacking awareness of an event would not typically provide a manual indication of the user's 104 presence. One or more servers 106 or other computing devices 400 may be used to determine the dwell time 132(2) using the first time T(1) and second time T(2).

At 514, the length of time the user 104(4) was within the threshold distance of the event location 110(2) is compared to the base dwell time 508 to determine a variance 516. In the depicted scenario, the base dwell time 508 is 3.5 hours, and the dwell time 132(2) of the user 104(4) is 4 hours. The server(s) 106 are shown determining that the dwell time 132(2) of the user 104(4) exceeds the base dwell time 508 by a variance 516 of 0.5 hours.

At 518, the rating metric 130 is adjusted based on the variance 516. In the depicted scenario, the variance 516 of 0.5 hours greater than the base dwell time 508 is determined to be equal to one star greater than the average rating metric 130(1). In some implementations, the magnitude of the variance 516 may affect the magnitude of the adjustment to the rating metric 130. In other implementations, the existence of a positive or negative variance 516 may cause a modification of the rating metric 130 by a fixed quantity in a positive or negative direction. In some implementations, a variance 516 of less than a threshold magnitude may be disregarded. In other implementations, variances 516 that far exceed a threshold magnitude may be disregarded as statistical abnormalities or erroneous data. In the depicted scenario, the existence of a positive variance 516 of 0.5 hours may be used to provide an automatic user rating of four stars, resulting in an adjusted rating metric 130(2) of 3 and ⅓ stars.

Figure 6:
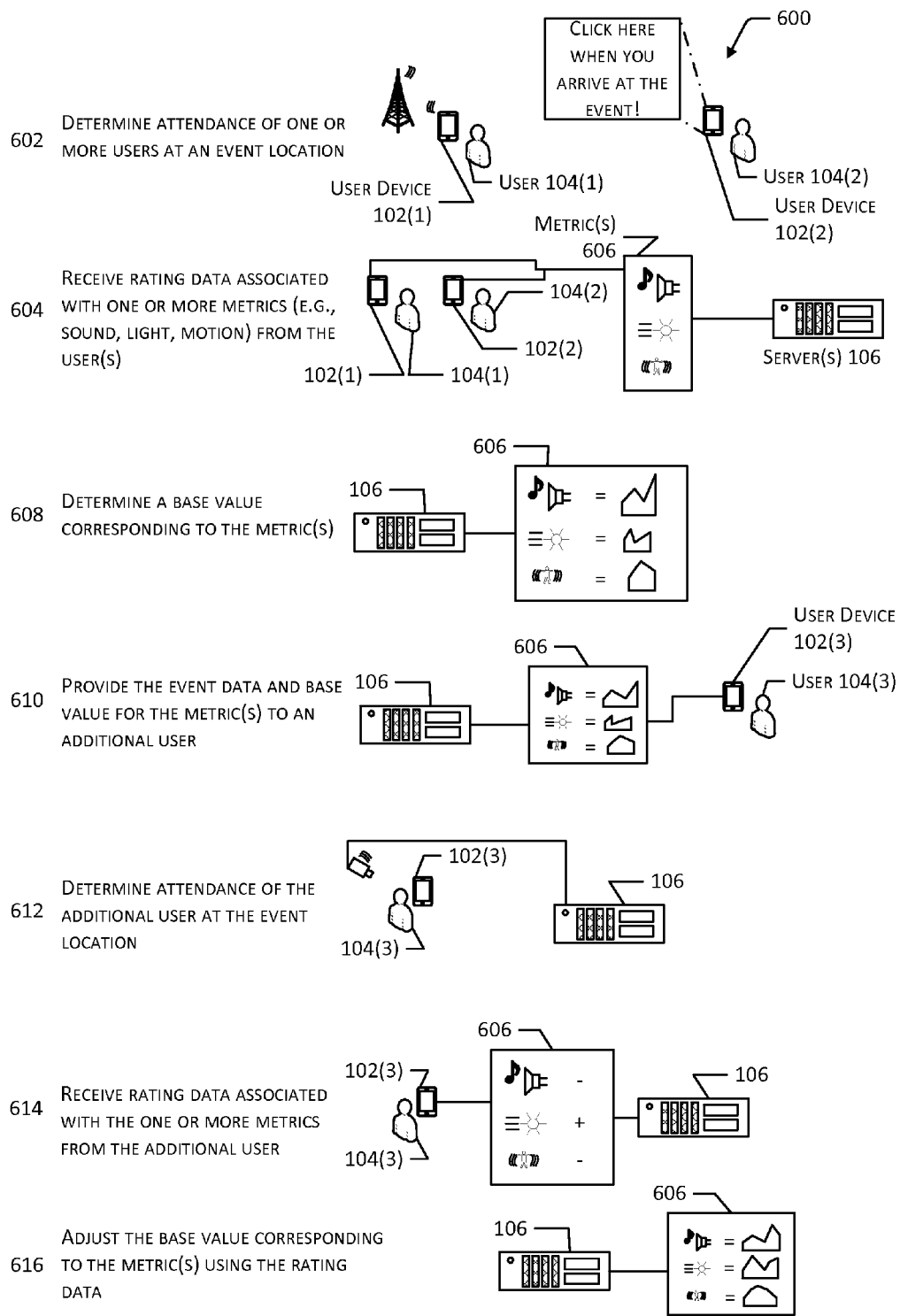
FIG. 6 illustrates a scenario for determining and adjusting multiple metrics associated with an event.

FIG. 6 illustrates a scenario 600 in which various metrics associated with an event may be determined and modified from rating data 132 received from one or more users 104. At 602, attendance of one or more users 104 at an event location 110(2) is determined. For example, a location of a user 104(1) associated with a user device 102(1) may be determined to be within a threshold distance of the event location 110(2) through use of one or more location sensors. A location of a user 104(2) associated with a user device 102(2) may be determined through a manual indication of presence at the event location 110(2) provided by the user 104 to the user device 102(2).

At 604, rating data 132 associated with one or more metrics 606, such as sound, light, motion, and so forth, is received from the users 104(1) and 104(2). For example, microphones 422 or other audio devices in communication with the user devices 102(1) and 102(2) may receive sound associated with the event location 110(2). Cameras 420 or other light or image sensors associated with the user devices 102(1) and 102(2) may receive light associated with the event location 110(2). Motion sensors or cameras 420 associated with the user devices 102(1) and 102(2) may determine motion associated with one or more users 104 at the event location 110(2). Values for one or more of the determined metrics 606 may be provided to the server(s) 106.

At 608, a base value corresponding to one or more of the metrics 606 may be determined. For example, an average value (e.g., a mean, mode, or median value) associated with a metric 606 at a given time or range of times may be calculated. FIG. 6 depicts the base value for the metrics 606 as a graph indicating an intensity of sound, light, motion, and so forth, present at an event location 110(2) for a range of times.

At 610, event data 110 and the base values for the metric(s) 606 are provided to an additional user 104(3) associated with an additional user device 102(3). One or more of the metric(s) 606 may be presented to the user 104(3) as independent values to facilitate the user's 104(3) decision to attend the event based on criteria of importance or interest to the user 104(3). For example, a user 104 preferring a loud, dimly-lit venue, with mobile attendees may decide whether to attend or refrain from attending an event based at least in part on the values associated with the metrics 606.

At 612, attendance of the additional user 104(3) at the event location 110(2) may be determined. For example, a camera 420 or similar device at or proximate to the event location 110(2) may determine the presence of the user 104(3) and communicate attendance of the user 104(3) to the server(s) 106.

At 614, rating data 132 associated with the metric(s) 606 may be received from the additional user 104(3). For example, the user device 102(3) may determine an intensity of sound, light, motion, and so forth, associated with the event location 110(2). The values determined by the user device 102(3) may differ from the base values. For example, in the depicted scenario 600, the intensity of sound may be less than the base value, the amount of light may be greater than the base value, and the amount of motion may be less than the base value. The determined values for the metric(s) 606 may be provided to the server(s) 106.

At 616, the base values corresponding to the metric(s) 606 may be adjusted using the rating data 132 received from the user device 102(3). As such, the metric(s) 606 may include dynamic values, measured by one or more user devices 102, that may change periodically or continuously.

Figure 7:
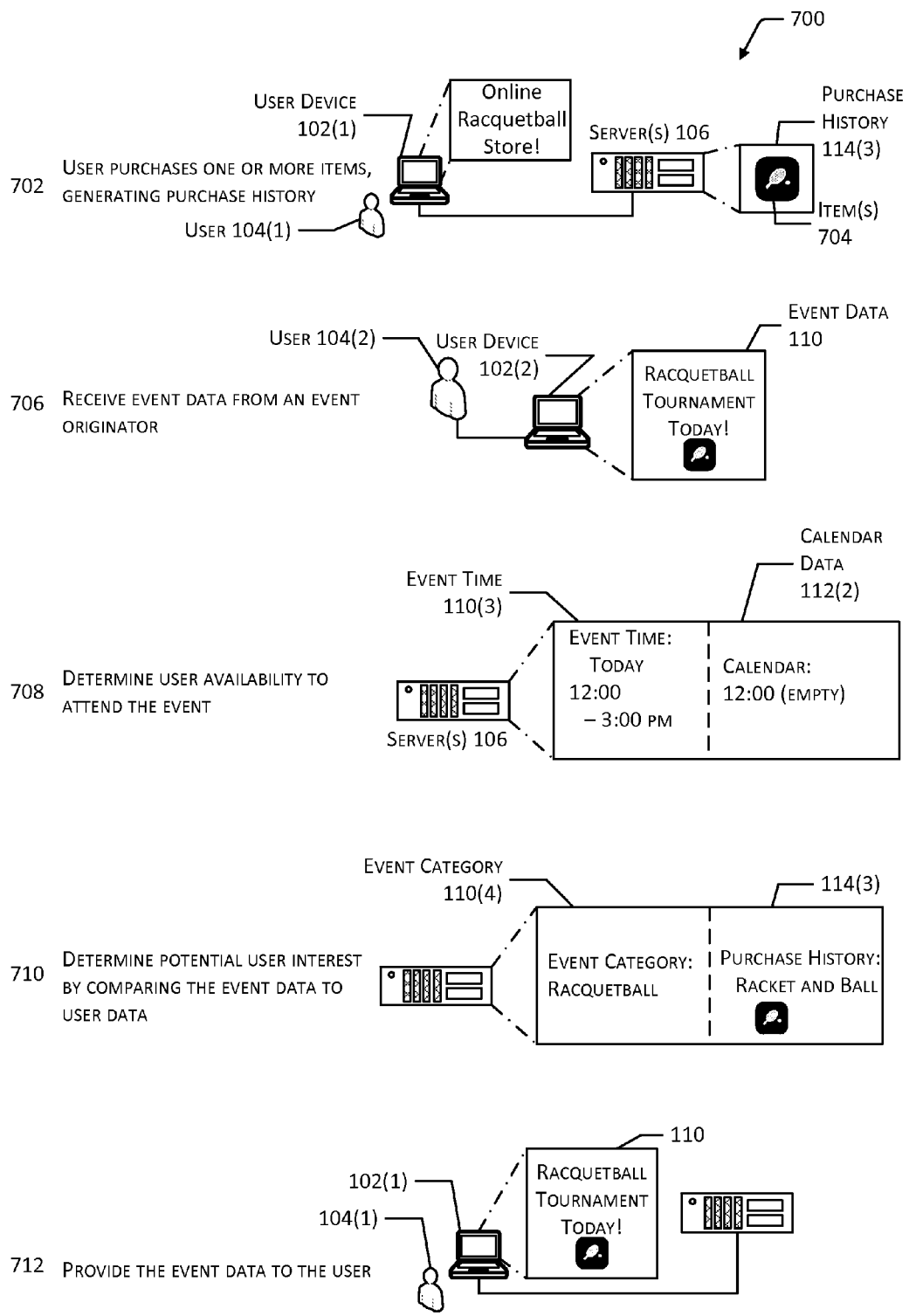
FIG. 7 illustrates a scenario for providing selected event data to a user based on user purchase history.

FIG. 7 illustrates a scenario 700 for providing selected event data 124 to a user 104 based on a user purchase history 114(3). At 702, a user 104(1) is shown purchasing one or more items 704 using a user device 102(2). One or more servers 106 may store the purchase of the item(s) 704 as a purchase history 114(3) associated with the user 104(1). While the depicted implementation illustrates the user 104(1) accessing an online merchant to purchase one or more items 704, in other implementations, purchase history 114(3) may be generated via the purchase of item(s) 704 from a merchant at a physical (e.g., "brick and mortar") location. The illustrated scenario 700 depicts the user 104(1) purchasing a racquetball racket and ball from an online store.

At 706, event data 110 is received from an event originator such as a user 104(2) using a user device 102(2). The event data 110 may include an event identifier 110(1), an event location 110(2), an event time 110(3), an event category 110(4), and so forth. For example, at 708, the illustrated scenario 700 depicts the event data 110 including "Today 12:00-3:00 PM" as the event time 110(3) and "Racquetball" as the event category 110(4).

At 708, user availability to attend the corresponding event is determined. For example, availability data 112 may be determined from the user device 102(1), one or more servers 106, or other computing devices 400. The availability data 112 may be compared with at least a portion of the event data 110. In the depicted scenario 700, one or more servers 106 are shown comparing the event time 110(3) with calendar data 112(2) associated with the user 104(1). For example, the depicted event time 110(3) is indicated as "Today 12:00-3:00 PM" while the depicted calendar data 112(2) indicates that the user 104(1) is available during the event time 110(3) via the indication "12:00 (Empty)."

At 710, potential user interest is determined by comparing the event data 110 to user data 114. For example, the depicted scenario 700 illustrates a comparison between the event category 110(4) "Racquetball" and the user purchase history 114(3), which includes a racquetball and racket. Due to the corresponding nature of the item(s) 704 present within the purchase history 114(3) and the event category 110(4), a determination of user interest in the event may be made. Responsive to a determination of user interest, at 712, the event data 110 is provided to the user 104(1).

Figure 8:
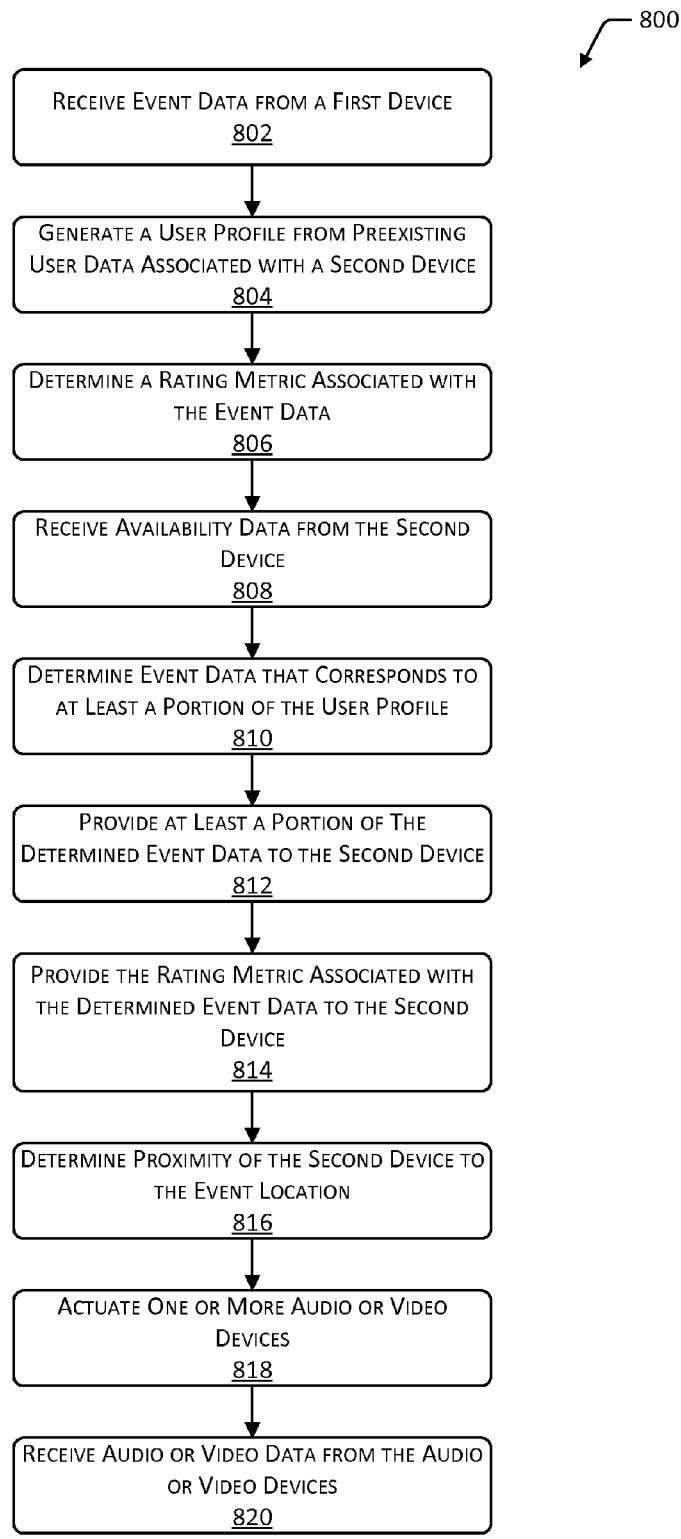
FIG. 8 is a flow diagram illustrating a process to determine event data for provision to a user and receive audio or video data responsive to user attendance at a selected event.

FIG. 8 is a flow diagram 800 illustrating a process to determine event data 110 for provision to a user 104 and receive audio data 132(5) or image data 132(4) responsive to user attendance at an event.

Block 802 receives event data 110 from a first device. For example, a user device 102 may be used to provide one or more of an event location 110(2), an event time 110(3), an event category 110(4), and so forth, to one or more servers 106 or other computer readable storage media or computing devices 400.

Block 804 generates a user profile 126 from preexisting user data 114 associated with a second device. The user data 114 may include a large variety of information associated with one or more users 104 or user devices 102. Generation of a user profile 126 from preexisting items of user data 114 may facilitate comparison of items of user data 114 relevant to the determination of one or more events of potential interest to a user 104 with items of event data 110. For example, the user profile 126 may include a location history 114(1), time data 114(2), purchase history 114(3), browsing history 114(4), search history 1143(5), user event preferences 114(7), and so forth, associated with a user 104 or user device 102. In some implementations, the user profile 126 may include one or more user event preferences 114(7) determined from preexisting user data 114 without requiring user input.

Block 806 determines a rating metric 130 associated with the event data 110. A rating metric 130 may be determined using the attendance or absence of one or more users 104, a dwell time 132(2) associated with one or more users 104, user ratings and reviews 132(3), and so forth.

Block 808 receives availability data 112 from a second device. For example, a device location 112(1) of a user device 102, current purchase activity 112(3), browsing activity 112(4), searching activity 112(5), user availability preferences 112(6), and so forth, may be used to determine user availability. In some implementations, one or more items of availability data 112 may be compared with a base activity metric 120 to determine user availability or lack thereof. In other implementations, selected items of availability data 112 may determine an activity metric 118 indicating availability or lack thereof, independent of a base activity metric 120 or items of user data 114.

Block 810 determines event data 110 that corresponds to at least a portion of the user profile 126. For example, an event location 110(2) may be within a threshold distance of one or more locations present in the location history 114(1) of a user 104; an event category 110(4) may correspond to one or more items present in a purchase history 114(3) of a user 104; and so forth.

Block 812 provides at least a portion of the determined event data 110 to the second device. For example, selected event data 124 may be provided to a user device 102, such that a user 104 may attend the corresponding event. Block 814 provides the rating metric 130 associated with the determined event data 110 to the second device. The rating metric 130 may facilitate a decision of a user 104 regarding whether to attend an event.

Block 816 determines proximity of the second device to the event location 110(2). For example, through use of location sensors, a location of a user device 102 may be determined and compared to the event location 110(2). Presence of the user device 102 within a threshold distance of the event location 110(2) may result in a determination of proximity. Usable locations sensors may include radio navigation-based systems, such as terrestrial or satellite-based navigational systems. Satellite-based navigation systems may include one or more of a Global Positioning System (GPS) receiver, a global navigation satellite system (GLONASS) receiver, a Galileo receiver, an Indian Regional Navigational Satellite System, and so forth.

Block 818 actuates one or more audio or video devices responsive to presence of the second device within a threshold distance of the event location 110(2). For example, a camera 420 or audio recording device within a user device 102 may be actuated, such that acquisition of audio or video data by the user device 102 is automatically initiated. In some implementations, an audio or video device located at or near the event location 110(2) may be actuated. Data acquired by audio or video devices may be provided to one or more servers 106 or other computing devices 400 for processing.

Block 820 receives audio or video data from the audio or video devices, whether associated with a user device 102 or with the event location 110(2). Audio data 132(5) and image data 132(4) received from one or more computing devices 400 at or near an event location 110(2) may be used to enhance security of users 104 at the event location 110(2), to modify the rating metric 130 associated with the selected event data 124, or to verify the event location 110(2) or other portions of the event data 110.

FIG. 9 is a flow diagram 900 illustrating a process to determine event data 110 for provision to a user 104 and to verify the event location 110(2).

Block 902 receives event data 110 from a first device. For example, a user device 102 may be used to provide one or more of an event location 110(2), an event time 110(3), an event category 110(4), and so forth, to one or more servers 106 or other computer readable storage media or computing devices 400.

Block 904 receives one or more images of an event location 110(2) from the first device. For example, to enhance security of an event, to provide additional information to users 104, or to affect the rating metric 130 associated with the selected event data 124, an event originator may be requested to provide image data 132(4) corresponding to an event location 110(2).

Block 906 processes the image(s) to determine a location at which the images were acquired. For example, metadata present in the image data 132(4) may be processed to determine a location of a device used to acquire the image(s) and the time the image(s) were acquired. In some implementations, image recognition software may be used to determine the location using at least a portion of the content of the one or more image(s).

Block 908 compares the location at which the image(s) were acquired to the event location 110(2). A determination that the image(s) were acquired at the event location 110(2) may result in generation of a verification of the event location 110(2).

Block 910 determines event data 110 corresponding to at least a portion of user data 114 associated with a second device. For example, an event time 110(3) may correspond to an unoccupied time indicated in time data 114(2) associated with a user device 102, or user event preferences 114(7) may indicate that the event location 110(2), the event time 110(3), or the event category 110(4) are of interest to a user 104.

Block 912 provides at least a portion of the determined event data 110 to the second device. For example, selected event data 124 may be provided to a user device 102, such that a user 104 may attend the event.

Block 914 provides an indication of verification of the event location 110(2) to the second device. The verification may include a notation that the event location 110(2) has been verified. In some implementations, the indication of verification may include one or more images of the event location 110(2). In other implementations, the indication of verification may affect the rating metric 130 associated with the selected event data 124. For example, the presence of a verification may positively affect the rating metric 130, while the absence of a verification may negatively affect the rating metric.

The processes discussed herein may be implemented in hardware, software, or a combination thereof. In the context of software, the described operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as possible forms of implementing the claims.

What is claimed is:

1. A system comprising:
a processor and a computer-readable storage medium; and
computer instructions in the computer-readable storage medium for instructing the processor to:
access event data indicative of a plurality of events, wherein the event data comprises information indicative of an event location, an event time, and an event description;
determine availability data of a user, wherein the availability data comprises one or more of: a current device location, a current unoccupied time, a current purchase activity, or a user preference;
determine preexisting user data indicative of one or more of device location data, time data, purchase history data, browsing history data, search history data, or event attendance data;
based on the preexisting user data, determine a base activity metric indicative of patterns in the user data, wherein the base activity metric includes one or more of: an expected location or an expected purchase activity;
determine a deviation from the base activity metric by comparing the availability data to the base activity metric, wherein the deviation is indicative of availability of the user to attend an event;
select, using the event data and the purchase history, the event from the plurality of events;
provide at least a portion of the event data of the event to a user device associated with the user;
determine the user device is within a threshold distance of the event location; and
responsive to the user device being within the threshold distance of the event location, cause one or more of the user device or a device at the event location to acquire one or more of audio data or image data of the event location; and
receive the one or more of the audio data or the image data of the event location from the one or more of the user device or the device at the event location.

2. The system of claim 1, wherein the computer instructions further instruct the processor to:
determine a base dwell time corresponding to the event, wherein the base dwell time is indicative of time spent by at least one additional user within the threshold distance of the event location;
determine a length of time the user is within the threshold distance of the event location associated with the event; and
determine a rating metric associated with the event and the user of the user device, wherein the rating metric is based on a variance between the length of time the user is within the threshold distance of the event location and the base dwell time.

3. The system of claim 1, further comprising computer-executable instructions to:
receive, from the user device, at least one image of the event location;
process the at least one image to determine a location at which the at least one image was acquired;
compare the location at which the at least one image was acquired to the event location to determine that the at least one image corresponds to the event location; and
provide an indication of verification of the event location.

4. The system of claim 1, further comprising computer-executable instructions to:
determine rating data associated with the event data, wherein the rating data comprises at least one metric;
determine one or more user interactions with the user device when the user device is within the threshold distance of the event location, wherein the one or more user interactions include one or more of:
acquiring at least one image at the event location or generating at least one message at the event location; and modifying the rating data based on the one or more user interactions.

5. A method comprising:
accessing event data indicative of a plurality of events, the event data comprising one or more of an event location, an event time, or an event category;
generating a base activity metric from preexisting user data, wherein the preexisting user data comprises:
purchase history; and
location data indicative of previous user behavior;
accessing availability data indicative of one or more current user behaviors;
determining an indication of availability to participate in an event based on a deviation between the availability data and the base activity metric;
determining the event data of one or more of the plurality of events corresponds to at least a portion of the preexisting user data;
providing, to a user device, at least a portion of the event data of the determined one or more of the plurality events;
receiving, from the user device, at least one image of the event location;
processing the at least one image to determine a location at which the at least one image was acquired;
comparing the location at which the at least one image was acquired to the event location to determine that the at least one image corresponds to the event location; and
providing an indication of verification of the event location.

6. The method of claim 5, wherein determining the event data of the one or more of the plurality of events corresponds to the at least a portion of the preexisting user data comprises one or more of:
determining the event location is within a threshold distance of at least one previous location determined from the preexisting user data; or
determining the event location is within a threshold distance of a current location determined from the availability data.

7. The method of claim 5, wherein the event category is associated with at least one type of item, and wherein determining the event data of the one or more of the plurality of events comprises one or more of:
determining, from the purchase history, data indicative of at least one item that corresponds to the at least one type of item;
determining, from a browsing history, data indicative of the at least one item that corresponds to the at least one type of item;
determining, from a search history, data indicative of the at least one item that corresponds to the at least one type of item; or
determining, from device data, data indicative of at least one item that corresponds to the at least one type of item.

8. The method of claim 5, wherein the event data comprises data indicative of an item, and wherein determining the event data of the one or more of the plurality of events comprises:
processing one or more of the purchase history, a search history, or a browsing history, to determine data indicative of one or more of the item or at least one additional item related to the item.

9. The method of claim 5, further comprising:
determining rating data comprising one or more of:
ratings or reviews received from one or more devices;
a length of time the one or more devices were within a threshold distance of the event location;
a user identity associated with the one or more devices;
a user account associated the one or more devices;
the at least one image comprising data associated with the event location;
a count of images associated with the event data acquired by the one or more devices;
a count of communications associated with the event data generated by the one or more devices; or
second event data that corresponds to the event data; and
determining a rating metric associated with the event data using the rating data.

10. The method of claim 9, further comprising:
determining a base dwell time corresponding to the event, wherein the base dwell time is indicative of an average length of time a user remains within the threshold distance of the event location; and
determining the rating metric using a variance between the length of time at least one of the one or more devices is within the threshold distance of the event location and the base dwell time.

11. The method of claim 5, wherein the availability data comprises motion data indicative of motion of the user device corresponding to user behavior.

12. The method of claim 5, wherein the base activity metric is further based on one or more of: calendar data, user preference data, a browsing history, a search history, device data, or user biomedical data.

13. The method of claim 5, further comprising:
determining a user is within a threshold distance of the event location; and
receiving one or more of audio data or image data of the event location from one or more of: the user device associated with the user, an audio device associated with the event location, or a video device associated with the event location.

14. The method of claim 5, further comprising:
determining rating data associated with the event data, wherein the rating data includes at least one metric;
determining one or more user interactions with the user device when the user device is within a threshold distance of the event location; and
modifying the rating data based on the one or more user interactions.

15. A non-transitory computer-readable medium comprising instructions for causing a processor to perform a method of:
accessing event data indicative of a plurality of events, the event data comprising one or more of: an event location, an event time, or an event description;
determining rating data associated with the event data, wherein the rating data comprises at least one metric;
determining a base value for the at least one metric using the rating data, wherein the base value is indicative of a value of the at least one metric received from at least one user at the event location;
determining availability data of a user, the availability data indicating one or more current user behaviors;
determining a base activity metric of the user based on preexisting user data indicative of one or more previous user behaviors;
determining an indication of availability of the user to attend an event based on a deviation between the availability data and the base activity metric;
selecting, using the event data and the user data, an event from the plurality of events;
providing at least a portion of the event data of the event and the base value of the at least one metric to a user device;

determining the user device is within a threshold distance of the event location;

determining one or more user interactions with the user device when the user device is within the threshold distance of the event location;

determining, based on the one or more user interactions, an additional value for the at least one metric from the user device;

determining a variance between the additional value of the at least one metric and the base value of the at least one metric; and modifying the base value of the at least one metric using the variance.

16. The non-transitory computer-readable medium of claim 15, wherein the one or more user interactions include generating at least one image and the instructions further cause the processor to:

process the at least one image to determine content corresponding to the event data; and modify the base value of the at least one metric using one or more of: a count of images acquired at the event location or the content corresponding to the event data.

17. The non-transitory computer-readable medium of claim 15, wherein the one or more user interactions include generating at least one message and the instructions further cause the processor to:

process the at least one message to determine content corresponding to the event data; and modify the base value of the at least one metric using one or more of: a count of messages or the content of the at least one message.

18. The non-transitory computer-readable medium of claim 15, wherein the instructions further cause the processor to determine the additional value for the at least one metric by one or more of:

determining motion data from one or more of a motion sensor or an image sensor associated with the user device;

determining audio data from a microphone associated with the user device;

determining a number of individuals at the event location using data acquired from the image sensor associated with the user device; or determining light intensity at the event location using data acquired from the image sensor or a light sensor associated with the user device.

19. The non-transitory computer-readable medium of claim 15, wherein the instructions further cause the processor to determine a rating metric by:

receiving at least one image comprising data associated with a location where the at least one image was acquired;

comparing the location where the at least one image was acquired to the event location; and based on the at least one image corresponding to the event location, provide an indication of verification of the event location.

20. The non-transitory computer-readable medium of claim 15, wherein the instructions further cause the processor to determine a rating metric by:

receiving second event data that corresponds to the event data, wherein the event data is received from a first device, and wherein the second event data is received from a second device.

\* \* \* \* \*